United States Patent
Kawai et al.

(10) Patent No.: US 11,062,466 B2
(45) Date of Patent: Jul. 13, 2021

(54) INFORMATION PROCESSING APPARATUS AND METHOD

(71) Applicant: SONY CORPORATION, Tokyo (JP)

(72) Inventors: Takuro Kawai, Tokyo (JP); Kenichiro Hosokawa, Kanagawa (JP); Koji Nishida, Tokyo (JP); Keisuke Chida, Saitama (JP)

(73) Assignee: SONY CORPORATION, Tokyo (JP)

(*) Notice: Subject to any disclaimer, the term of this patent is extended or adjusted under 35 U.S.C. 154(b) by 4 days.

(21) Appl. No.: 16/475,766

(22) PCT Filed: Feb. 8, 2018

(86) PCT No.: PCT/JP2018/004290
§ 371 (c)(1),
(2) Date: Jul. 3, 2019

(87) PCT Pub. No.: WO2018/155198
PCT Pub. Date: Aug. 30, 2018

(65) Prior Publication Data
US 2019/0370986 A1     Dec. 5, 2019

(30) Foreign Application Priority Data
Feb. 22, 2017  (JP) .............................. JP2017-031075

(51) Int. Cl.
*G06T 7/30*      (2017.01)
*G06T 7/00*      (2017.01)
*H04N 5/33*      (2006.01)

(52) U.S. Cl.
CPC .................. *G06T 7/30* (2017.01); *G06T 7/97* (2017.01); *H04N 5/33* (2013.01); *G06T 2207/20221* (2013.01)

(58) Field of Classification Search
CPC combination set(s) only.
See application file for complete search history.

(56) References Cited

U.S. PATENT DOCUMENTS

| 8,125,613 B2* | 2/2012 | Suzuki | G03F 7/70875 |
| | | | 355/53 |
| 8,687,057 B2* | 4/2014 | Kobayashi | H04N 13/254 |
| | | | 348/135 |

(Continued)

FOREIGN PATENT DOCUMENTS

| CN | 102752589 A | 10/2012 |
| CN | 105592310 A | 5/2016 |

(Continued)

OTHER PUBLICATIONS

International Search Report and Written Opinion of PCT Application No. PCT/JP2018/004290, dated May 1, 2018, 06 pages of ISRWO.

(Continued)

*Primary Examiner* — Gregory M Desire
(74) *Attorney, Agent, or Firm* — Chip Law Group

(57) ABSTRACT

The present disclosure relates to an apparatus and a method for information processing enabling alignment between imaged images to be more accurately performed. With respect to a detection result of a correspondence point between an imaged image including a pattern irradiated for alignment with other imaged image, and the other imaged image including the pattern, an evaluation value with which an occurrence rate of an error in the alignment when the imaged image and the other imaged image are composed with each other is evaluated is calculated; and an irradiated position of the pattern is updated on the basis of the evaluation value calculated. The present disclosure, for example, can be applied to an information processing apparatus, an irradiation device, an imaging apparatus, an irradiation imaging apparatus, a controller, an imaging system or the like.

21 Claims, 19 Drawing Sheets

(56) References Cited

U.S. PATENT DOCUMENTS

| | | | | |
|---|---|---|---|---|
| 8,885,176 | B2* | 11/2014 | Tabuchi | G01B 11/24 |
| | | | | 356/609 |
| 9,813,647 | B2* | 11/2017 | Kobayashi | G06T 5/40 |
| 10,746,539 | B2* | 8/2020 | Suenaga | G01B 11/2513 |
| 2012/0182397 | A1* | 7/2012 | Heinzle | H04N 13/239 |
| | | | | 348/47 |
| 2012/0326007 | A1* | 12/2012 | Muto | G01C 15/002 |
| | | | | 250/206.2 |
| 2014/0240451 | A1 | 8/2014 | Sakano et al. | |

FOREIGN PATENT DOCUMENTS

| | | |
|---|---|---|
| JP | 2005-044077 A | 2/2005 |
| JP | 2014-164363 A | 9/2014 |
| JP | 2015-139031 A | 7/2015 |
| WO | 2015/040917 A1 | 3/2015 |

OTHER PUBLICATIONS

Office Action for CN Patent Application No. 201880012173.1, dated Sep. 2, 2020, 06 pages of Office Action and 08 pages of English Translation.

Office Action for CN Patent Application No. 201880012173.1, dated Apr. 6, 2021, 07 pages of English Translation and 06 pages of Office Action.

* cited by examiner

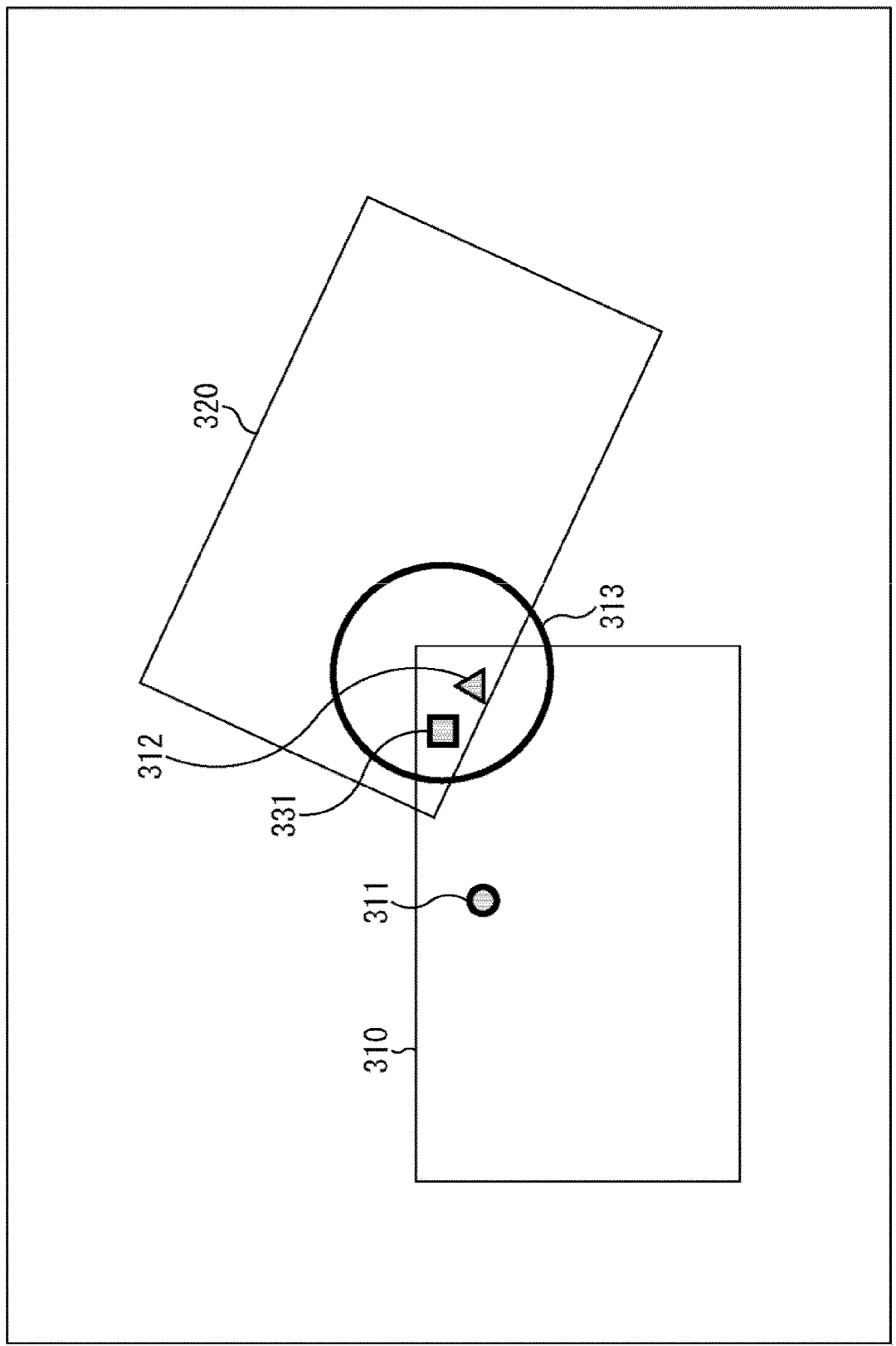

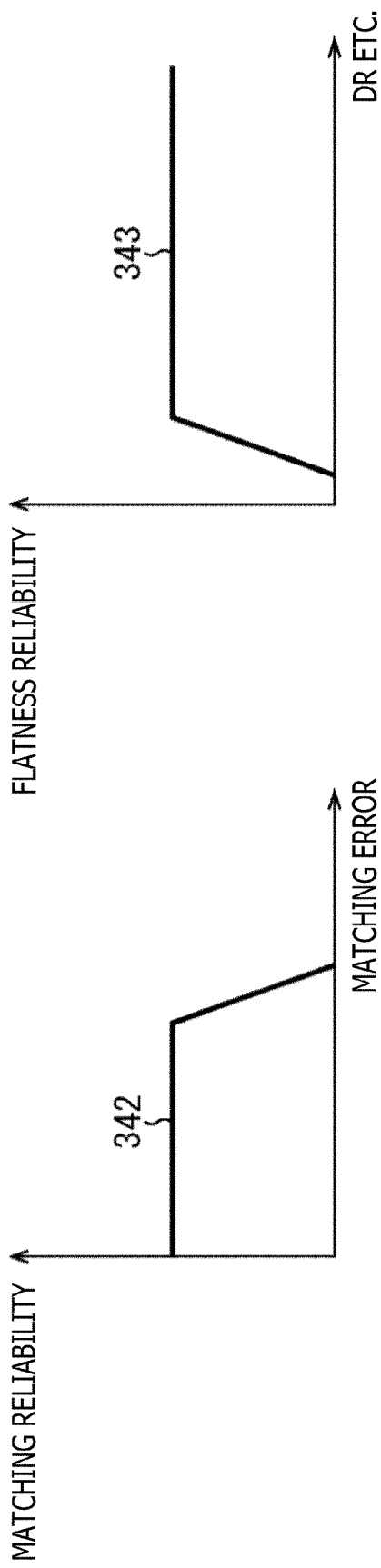

FIG. 16

| PATTERN IRRADIATION TIMING / PATTERN UPDATING METHOD | THE SAME TIME IRRADIATION (UTILIZE ONLY NEWEST PATTERN AT TIME OF EVALUATION) | TIME SERIES IRRADIATION (ALSO UTILIZE PAST PATTERN AT TIME OF EVALUATION) |
|---|---|---|
| CHANGE PATTERN OF POINT-OF-VIEW BEING PROCESSED (POSITION, SHAPE) | IRRADIATE PATTERN AGAIN TO AREA FOR WHICH POSSIBILITY OF ERROR IS DECIDED TO BE LARGE WITH RESPECT TO EVALUATION VALUE FOR CORRESPONDENCE POINT DETECTION.<br><br>* SHAPE OF PATTERN IS ARBITRARY | IRRADIATE PATTERN TO AREA FOR WHICH POSSIBILITY OF ERROR IS DECIDED TO BE LARGE WITH RESPECT TO EVALUATION VALUE FOR CORRESPONDENCE POINT DETECTION.<br><br>SUPERIMPOSE UPDATED PATTERN IRRADIATION RESULT ON LAST PATTERN IRRADIATION RESULT TO INCREASE THE NUMBER OF PATTERNS USED AS CLUE, THEREBY RECALCULATING CORRESPONDENCE POINT DETECTION. |
| IRRADIATE PATTERN OF POINT-OF-VIEW AGAIN IN WHICH CORRESPONDENCE POINT IS EASY TO TAKE TO POINT OF VIEW BEING PROCESSED (SHIFT PATTERN) | ADD PATTERN TO AREA FOR WHICH POSSIBILITY OF ERROR IS DECIDED TO BE LARGE WITH RESPECT TO EVALUATION VALUE FOR CORRESPONDENCE POINT DETECTION.<br><br>IRRADIATE PATTERN ORIGINALLY IRRADIATED AGAIN, AND ADD PATTERN OF DIFFERENT POINT OF VIEW. | ADD PATTERN TO AREA FOR WHICH POSSIBILITY OF ERROR IS DECIDED TO BE LARGE WITH RESPECT TO EVALUATION VALUE FOR CORRESPONDENCE POINT DETECTION.<br><br>IRRADIATE PATTERN ORIGINALLY IRRADIATED AGAIN, AND ADD PATTERN OF DIFFERENT POINT OF VIEW.<br><br>SUPERIMPOSE UPDATED PATTERN IRRADIATION RESULT ON LAST PATTERN IRRADIATION RESULT TO INCREASE THE NUMBER OF PATTERNS USED AS CLUE, THEREBY RECALCULATING CORRESPONDENCE POINT DETECTION. |

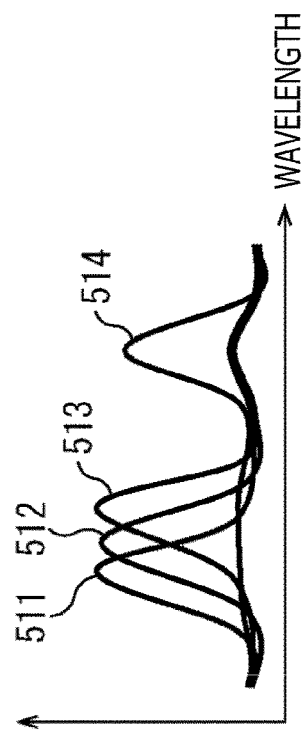

INFORMATION PROCESSING APPARATUS AND METHOD

CROSS REFERENCE TO RELATED APPLICATIONS

This application is a U.S. National Phase of International Patent Application No. PCT/JP2018/004290 filed on Feb. 8, 2018, which claims priority benefit of Japanese Patent Application No. JP 2017-031075 filed in the Japan Patent Office on Feb. 22, 2017. Each of the above-referenced applications is hereby incorporated herein by reference in its entirety.

TECHNICAL FIELD

The present disclosure relates to an apparatus and a method for information processing, and more particularly to an apparatus and a method for information processing each of which enables alignment between imaged images to be more accurately performed.

BACKGROUND ART

Heretofore, imaged images imaged with a plurality of cameras have been composed with one another to create an omnidirectional image or a panoramic image. In this case, the imaged images need to be accurately aligned with each other so as not to cause the incompatibility in a joint or the like between the imaged images. There has been a method of manually performing such alignment (e.g., refer to PTL 1).

CITATION LIST

Patent Literature

[PTL 1]
JP 2005-44077A

SUMMARY

Technical Problem

However, since in the case of the manual alignment, it took an enormous amount of time to create one piece of composite image, it was difficult to create the composite image of moving images. In addition, since in the manual alignment, the accuracy of the alignment depended on the proficiency of the worker, the alignment could not be necessarily sufficiently accurately performed.

The present disclosure has been made in the light of such a situation, and therefore enables the alignment between the imaged images to be more accurately performed.

Solution to Problem

An information processing apparatus according to an aspect of the present disclosure is an information processing apparatus including a calculation section, and an update section. In this case, the calculation section calculates an evaluation value with which an occurrence rate of an error in alignment when an imaged image including a pattern irradiated for alignment with an other imaged image, and the other imaged image including the pattern are composed with each other is evaluated with respect to a detection result of a correspondence point between the imaged image and the other imaged image. The update section updates an irradiated position of the pattern on the basis of the evaluation value calculated by the calculation section.

The calculation section can calculate the evaluation value on the basis of magnitude of an error in matching of a predetermined partial area including the pattern.

The calculation section can, regardless of the error is larger or smaller than a predetermined range, set the evaluation value to a value representing that the error is higher in occurrence rate than in case of the predetermined range.

The calculation section can calculate the evaluation value on the basis of the magnitude of the error in the matching of the predetermined partial area including the pattern, and a feature amount of image of the partial area.

The calculation section can, in a case where the error is larger than a threshold value, set the evaluation value to a value representing that the error is higher in occurrence rate than in a case where the error is equal to or lower than the threshold value.

The image feature amount can be caused to be a parameter associated with dispersion of pixel values.

The calculation section can, in a case where the parameter associated with the dispersion of the pixel values is smaller than a predetermined threshold value, set the evaluation value to a value representing that the parameter associated with the dispersion of the pixel values is higher in error occurrence than in a case where the error is equal to or higher than the threshold value.

The calculation section can calculate the evaluation value on the basis of the magnitude of the error in the matching of the predetermined partial area including the pattern, and information associated with a relative posture between an imaging section performing the imaging to create the imaged image and the an other imaging section performing the imaging to create the other imaged image.

The calculation section can, in a case where the error is larger than a predetermined threshold value, set the evaluation value to a value representing that the error is higher in occurrence rate than in a case where the error is equal to or smaller than the threshold value.

The information associated with the relative posture can be caused to be magnitude of an error between the relative posture based on the detected correspondence point and an actual relative posture with respect to the imaging section and the other imaging section.

The calculation section can set the evaluation value to a value representing that the larger the error, the higher the occurrence rate of the error.

The update section can, in a case where the evaluation value is set to a value representing that an occurrence rate of an error is higher than the predetermined threshold value, update the irradiated position of the pattern so as to increase the number of patterns to be irradiated to an area in which the imaged image and the other imaged image are superimposed on each other.

The update section can move an irradiated position of an other pattern included in the imaged image to the area.

The update section can move the irradiated position of an other pattern irradiated to an outside of the imaged image to the area.

The information processing apparatus further includes a correspondence point detecting section performing detection of the correspondence point between the imaged image and the other imaged image by matching for a predetermined partial area including the pattern. In this case, the calculation section can be configured to calculate the evaluation value associated with the correspondence point detection result obtained from the correspondence point detecting section.

The correspondence point detecting section can perform the detection of the correspondence point on the basis of the newest pattern irradiation.

The correspondence point detecting section can perform the detection of the correspondence point on the basis of multiple times of the pattern irradiation.

The pattern can be caused to be irradiated as a laser beam.

The pattern can be caused to be irradiated as infrared light.

An information processing method according to another aspect of the present disclosure is an information processing method including calculating an evaluation value with which an occurrence rate of an error of alignment when an imaged image including a pattern irradiated for alignment with an other imaged image and the other imaged image including the pattern are composed with each other is evaluated with respect to a detection result of a correspondence point between the imaged image, and the other imaged image, and updating an irradiated position of the pattern on the basis of the calculated evaluation value.

In the apparatus and method for information processing according to the aspect of the present technology, with respect to the detection result of the correspondence point between the imaged image including the pattern irradiated for the alignment with the other imaged image, and the other imaged image including the pattern, the evaluation value with which the occurrence rate of the error of the alignment when the imaged image and the other imaged image are composed with each other is calculated is evaluated. The irradiated position of the pattern is updated on the basis of the calculated evaluation value.

Advantageous Effect of Invention

According to the present disclosure, the information can be processed. In particular, the alignment between the imaged images can be more accurately performed.

BRIEF DESCRIPTION OF DRAWINGS

FIG. 11 is a view depicting still another example of the alignment.

FIGS. 13A, 13B, and 13C are another views explaining the evaluation value.

FIG. 16 is a table explaining an example of update and an evaluation value calculating method.

FIGS. 17A, 17B, 17C, and 17D are views explaining an imaging apparatus.

DESCRIPTION OF EMBODIMENTS

Hereinafter, a description will be given with respect to modes for carrying out the present disclosure (hereinafter referred to as embodiments). It should be noted that the description will be given in accordance with the following order.

1. Alignment between Imaged Images
2. First Embodiment (Imaging System)
3. Second Embodiment (Imaging System and Irradiation Imaging Apparatus)
4. Others <1. Alignment Between Imaged Images>
<Image Composition and Alignment>

Figure 1A:
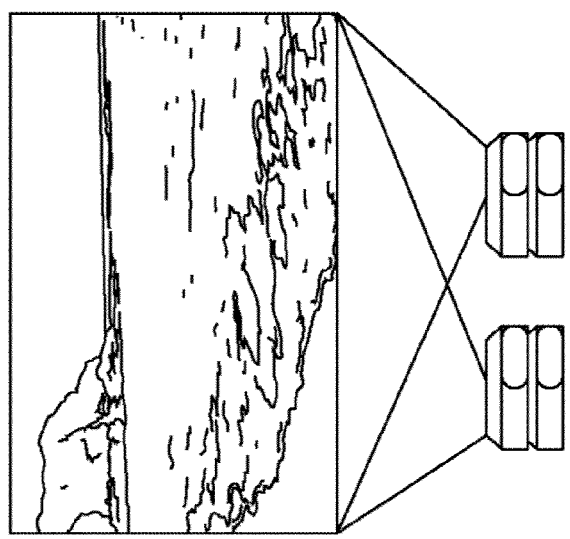
FIGS. 1A and 1B are views depicting an example of a situation of image composition.
Figure 1B:
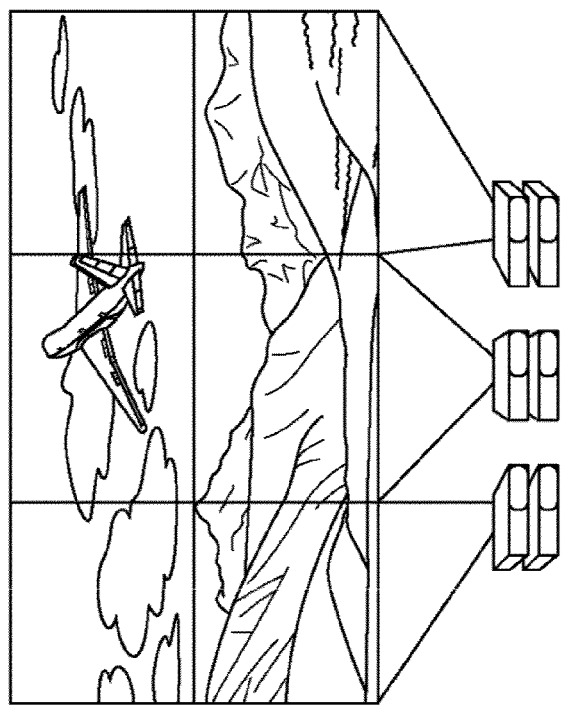
Figure 2:
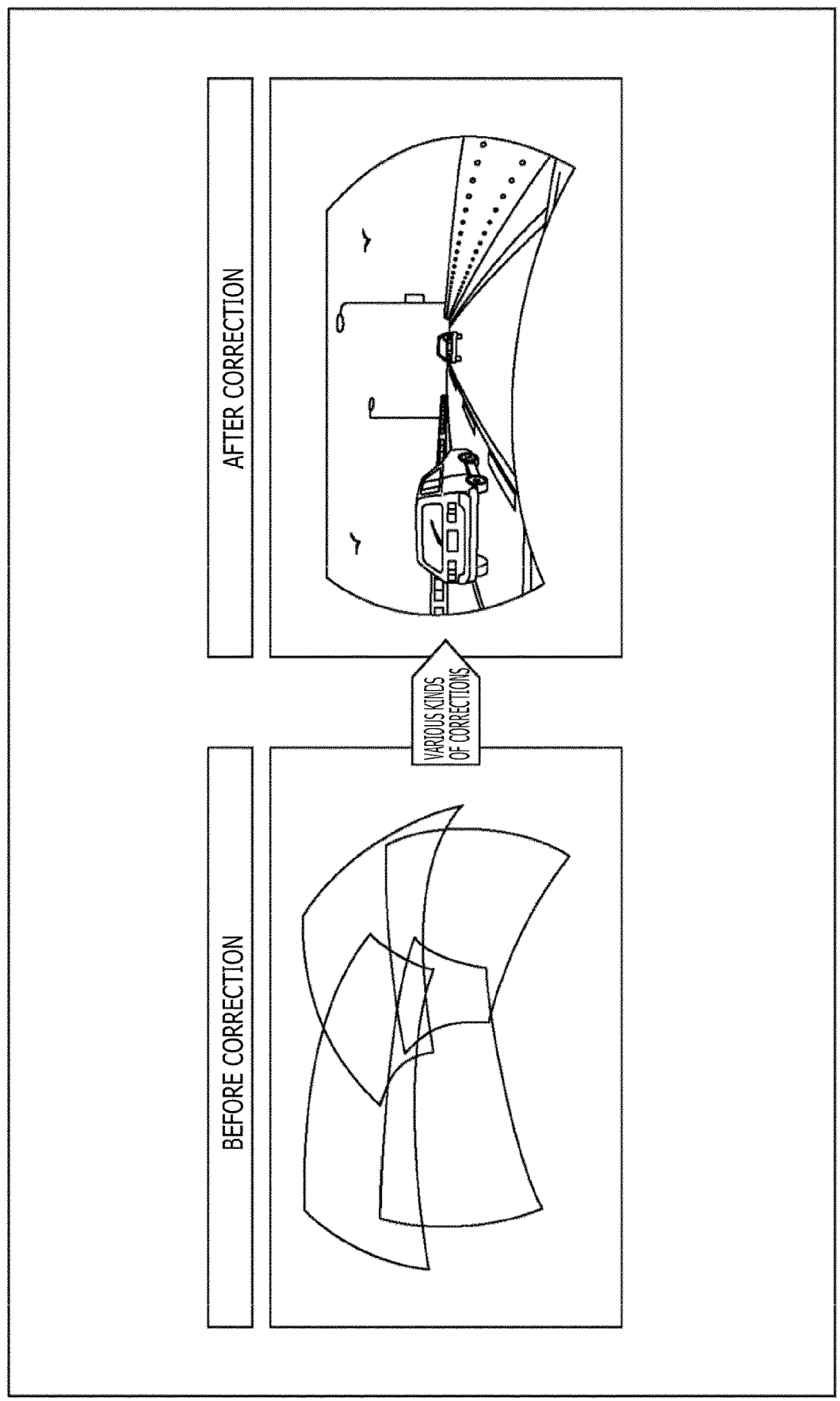
FIG. 2 is a view depicting another example of the situation of the image composition.

Hereinafter, imaged images imaged with a plurality of cameras have been composed with one another to obtain one piece of composite image in some cases. For example, there was a method in which, as depicted in FIG. 1A, the same portion (the same range) was imaged by using a plurality of imaging apparatuses with a timing being shifted, and the imaged images obtained from the respective cameras were combined with one another, thereby realizing a moving image at a higher frame rate than a frame rate of each of the cameras. In addition, for example, there was a method in which, as depicted in FIG. 1B, a wide range was imaged with a plurality of imaging apparatuses, and imaged images were composed with one another so as to be arranged side by side, thereby creating a composite image of a wider range than an imaging range of one imaging apparatus, for example, like a panoramic image. In addition, there was also a method in which like an example depicted in FIG. 2, geometric correction was also performed during the composition of the imaged images, thereby creating a composite image developed on a curved surface, for example, like an omnidirectional image.

For a user who views the image of such a composite image, when the composed imaged images are shifted in a portion in which a plurality of imaged images is viewed so as to be superimposed with each other by the user, the edge becomes geminates, or the color or luminance changes, and thus it is possible that the user feels uncomfortable. It should be noted that the portion which is viewed so as to be superimposed for the user includes not only a portion in which the imaged images are superimposed to be composed with each other on the data, but also a portion in which although the imaged images are not actually composed with each other and the data is separated, there is a possibility that the imaged images are superimposed to be composed with each other during the display, edition or the like. In addition, such images which can be composed with each other includes not only the images which are outputted/displayed at the same timing and displayed so as to be actually superimposed on each other, but also portions which are visually composed with each other by the user during the display, for example, portions which are displayed at timing different from each other, respectively, and are viewed in such a way that one residual image is superimposed on the other imaged image (e.g., a frame or the like).

In order to prevent the user from being caused to feel uncomfortable in such a portion in which a plurality of imaged images is superimposed on each other, there were devised various methods of aligning the imaged images to be composed. For example, PTL 1 discloses a method of composing a plurality of images while the perspectives of the images are unified, in which while a projection parameter of one of two pieces of images to be composed is manually successively changed, an image corresponding to the parameter or a part thereof is displayed, and an operator confirms the image quality from the displayed image.

However, since in the case of the manual alignment, it took an enormous amount of time to create one piece of composite image, it was difficult to create the composite image of moving images. In addition, since in the manual alignment, the accuracy of the alignment depended on the proficiency of the worker, the alignment could not be necessarily sufficiently accurately performed.

<Calculation of Evaluation Value and Regenesis of Pattern Displayed Position>

Then, for example, an information processing apparatus includes a calculation section and an update section. In this case, the calculation section calculates an evaluation value with which an occurrence rate of an error in alignment when an imaged image including a pattern irradiated for alignment with other imaged image, and the other imaged image including the pattern (the imaged image and the other imaged image) are composed with each other is evaluated with respect to a detection result of a correspondence point between the imaged image and the other imaged image. The update section updates an irradiated position of the pattern on the basis of the evaluation value calculated by the calculation section. In addition, for example, with respect to the detection result of the correspondence point between the imaged image including the pattern irradiated for the alignment with the other imaged image, and the other imaged image including the pattern, the evaluation value with which the occurrence rate of the error of the alignment when these imaged images (the imaged image and the other imaged image) are composed with each other is evaluated is calculated. The irradiated position of the pattern is updated on the basis of the calculated evaluation value. By adopting such a configuration, the alignment between the imaged images can be more accurately performed.

2. First Embodiment

<Imaging System>

Figure 3:
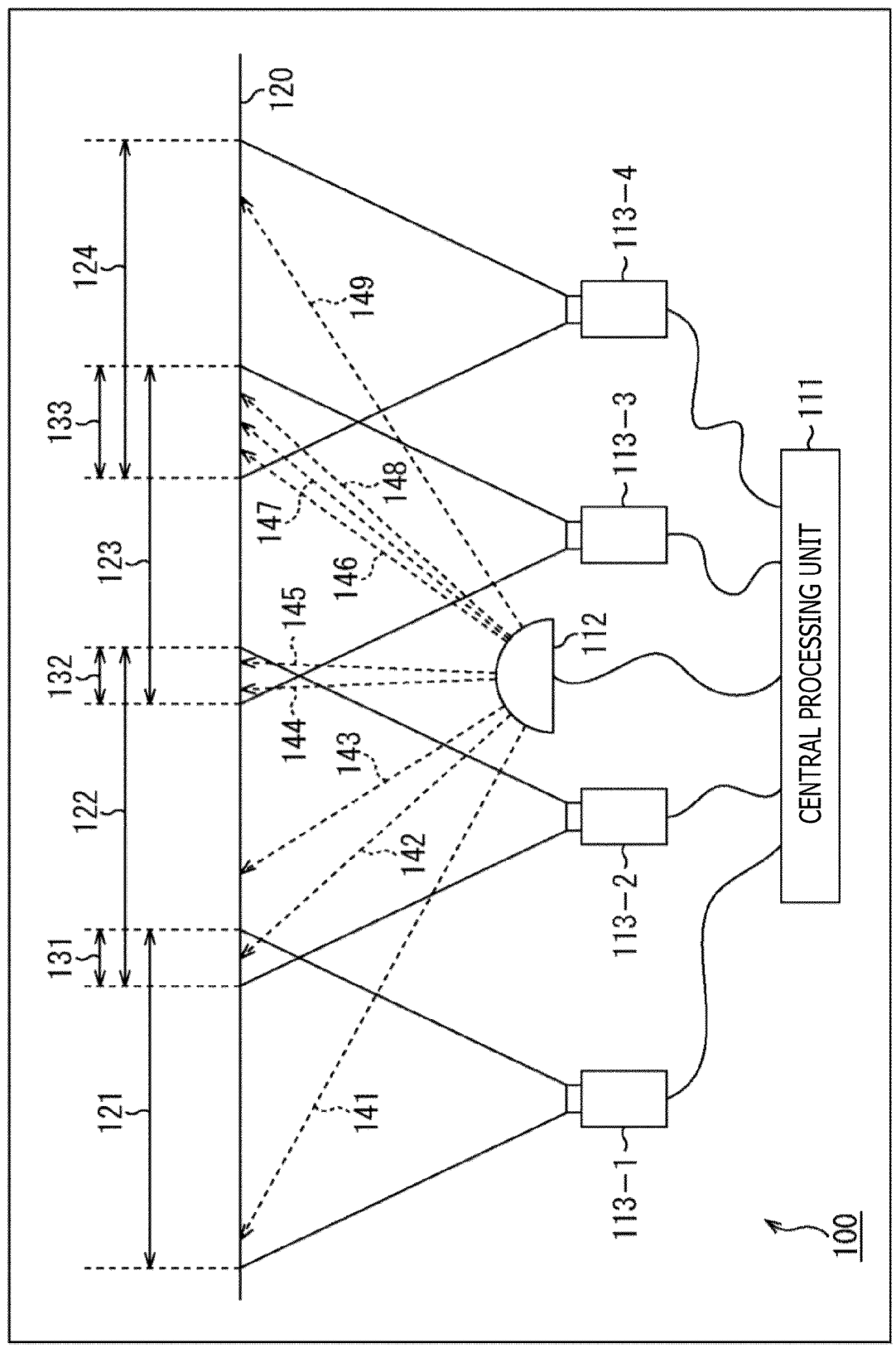
FIG. 3 is a block diagram depicting an example of a main configuration of an imaging system.

FIG. 3 is a block diagram depicting an example of a main configuration of a first embodiment of an imaging system to which the present technology is applied. In FIG. 3, an imaging system 100 is a system in which a predetermined pattern image for alignment is irradiated toward an arbitrary subject, the subject to which the predetermined pattern image is irradiated is imaged with a plurality of imaging apparatuses, thereby creating and outputting a plurality of imaged images each including the pattern image for the alignment. Then, the imaging system 100 executes such processing by using a technology which will be described later, thereby enabling a plurality of imaged images, each including a pattern image, which can be more accurately aligned with one another to be created and outputted.

As depicted in FIG. 3, the imaging system 100 includes a central processing unit 111, an irradiation device 112, and an imaging apparatus 113-1 to an imaging apparatus 113-4.

The central processing unit 111, and the irradiation device 112, and the imaging apparatus 113-1 to the imaging apparatus 113-4 are communicably connected to one another via predetermined cables as the communication media. The central processing unit 111 executes processing associated with control for the irradiation device 112, and the imaging apparatus 113-1 to the imaging apparatus 113-4, processing of composing the imaged images supplied from the imaging apparatus 113-1 to the imaging apparatus 113-4, and the like.

The irradiation device 112 is a device irradiating a laser beam to an arbitrary position (in an arbitrary direction). For example, the irradiation device 112 is controlled by the central processing unit 111 via the cable described above, and scans a subject in an arbitrary position (in an arbitrary direction) with the laser beam, thereby drawing a pattern image for alignment on a surface of the subject. For example, the irradiation device 112 irradiates the pattern image (laser beam) toward a wall 120 as the subject as indicated by a dotted arrow 141 to a dotted arrow 149 in accordance with the control by the central processing unit 111.

The number of patterns (laser beams) which can be simultaneously irradiated by the irradiation device 112 is arbitrary, and is by no means limited to the example of FIG. 3. In addition, the pattern image may have any pattern. In addition, the irradiation device 112 may irradiate a pattern with any light, and the laser beam may not be used.

Each of the imaging apparatus 113-1 to the imaging apparatus 113-4 is an apparatus which images a subject to create an imaged image, and outputs the resulting imaged image. In the following description, in the case where the imaging apparatus 113-1 to the imaging apparatus 113-4 need not to be distinguished from one another for a description, they are referred to as the imaging apparatuses 113. The imaging apparatus 113 is controlled by the central processing unit 111 via the cable described above, and images an arbitrary subject to obtain an imaged image. In addition, the imaging apparatus 113 supplies the resulting imaged image to the central processing unit 111 via the cable described above.

It should be noted that the imaging apparatus 113 can be installed in an arbitrary position and in an arbitrary posture. In other words, the imaging apparatus 113 can image an object in an arbitrary position and posture, at an arbitrary angle of view, and in an arbitrary direction. In other words, the imaging apparatus 113 can image an arbitrary imaging range. In addition, the central processing unit 111 may be caused to be enabled to perform not only the imaging execution control for each of the imaging apparatuses 113, but also arbitrary control associated with the imaging. For example, the central processing unit 111 may be enabled to control the setting associated with the imaging such as iris, exposure, and illumination of each of the imaging apparatuses 113. In addition, for example, the central processing unit 111 may be enabled to control the setting associated with an imaging range such as a position, a posture, and zoom of each of the imaging apparatuses 113.

It should be noted that the performance of each of the imaging apparatuses 113 (e.g., values of all parameters representing the performance associated with the imaging such as resolution, a dynamic range, contrast, a frame rate, an angle of view, and a shutter speed) may not be unified. In addition, the direction or posture in which the imaging apparatus 113 images an object may not be unified. For example, the imaging apparatus 113 may be present which images the direction different from any of others in the posture different from any of others. The imaging apparatuses 113 may image the directions different from one another in postures different from one another.

In case of an example of FIG. 3, the imaging apparatus 113-1 images a range indicated by a double-headed arrow 121 of the wall 120. In addition, the imaging apparatus 113-2 images a range indicated by a double-headed arrow 122 of the wall 120. In addition, the imaging apparatus 113-3 images a range indicated by a double-headed arrow 123 of the wall 120. In addition, the imaging apparatus 113-4 images a range indicated by a double-headed arrow 124 of the wall 120. A range indicated by a double-headed arrow 131 is a range in which the imaging range of the imaging apparatus 113-1 and the imaging range of the imaging apparatus 113-2 overlap each other. In addition, a range indicated by a double-headed arrow 132 is a range in which the imaging range of the imaging apparatus 113-2 and the imaging range of the imaging apparatus 113-3 overlap each other. Moreover, a range indicated by a double-headed arrow 133 is a range in which the imaging range of the imaging apparatus 113-3 and the imaging range of the imaging apparatus 113-4 overlap each other.

In case of the example of FIG. 3, one pattern image is irradiated to the range 131 (a dotted arrow 142), two pattern images are irradiated to the range 132 (a dotted arrow 144 and a dotted arrow 145), and three pattern images are irradiated to the range 133 (a dotted arrow 146, a dotted arrow 147, and a dotted arrow 148).

<Central Processing Unit>

Figure 4:
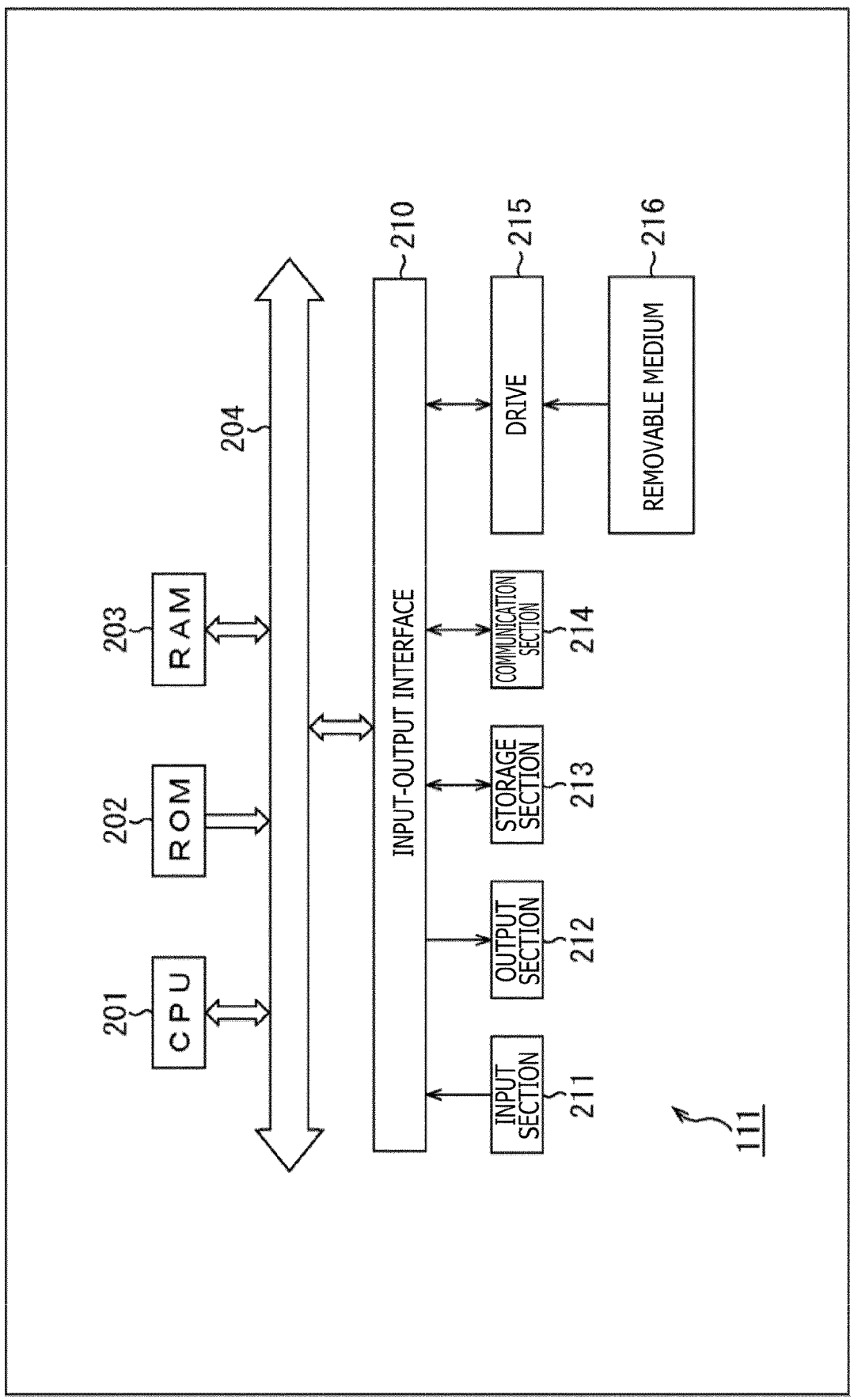
FIG. 4 is a block diagram depicting an example of a main configuration of a central processing unit.

FIG. 4 is a block diagram depicting an example of a main configuration of the central processing unit 111 as an embodiment of the information processing apparatus to which the present technology is applied. As depicted in FIG. 4, the central processing unit 111 includes a CPU 201, a ROM 202, a RAM 203, a bus 204, an input-output interface 210, an input section 211, an output section 212, a storage section 213, a communication section 214, and a drive 215.

The CPU 201, the ROM 202, and the RAM 203 are connected to one another via the bus 204. The input-output interface 210 is also connected to the bus 204. The input section 211, the output section 212, the storage section 213, the communication section 214, and the drive 215 are connected to the input-output interface 210.

The CPU 201, for example, loads a program or the like stored in the ROM 202 or the storage section 213 into the RAM 203 and executes the program or the like, thereby executing the various kinds of processing. Data or the like which is necessary for the CPU 201 to execute the various kinds of processing is also suitably stored in the RAM 203. For example, the CPU 201 executes the program or the like in such a manner, thereby enabling the various kinds of processing associated with the composition of the imaged image to be executed.

The input section 211 includes an input device which receives external arbitrary information such as a user input. The input device may be any type one. For example, the input device, for example, may be a keyboard, a mouse, a manipulation button, a touch panel, a camera, a microphone, a barcode reader or the like. In addition, the input device may be various kinds of sensors such as an acceleration sensor, an optical sensor, and a temperature sensor. Moreover, the input device may be an input terminal through which external arbitrary information is received as data (signal). The output section 212 includes an output device which outputs arbitrary information, in the inside of the apparatus, such as an image or a sound. The output device may be any type one. For example, the output device may be a display, a speaker or the like. In addition, the output device may be an output terminal through which arbitrary information is outputted as data (signal) to the outside.

The storage section 213 includes a storage medium which stores information such as a program or data. The storage medium may be any type one. For example, the storage medium may be a hard disc, a RAM disc, a non-volatile memory or the like. The communication section 214 includes a communication device which performs communication for giving and receiving information such as a program, data or the like to and from an external apparatus via a predetermined communication medium (e.g., an arbitrary network such as the Internet). The communication device may be any type one. For example, the communication device may be a network interface. A communication method or a communication standard of the communication by the communication section 214 is arbitrary. For example, the communication section 214 may be enabled to perform wired communication, may be enabled to perform wireless communication, or may be enabled to perform both the wired communication and the wireless communication.

The drive 215 executes processing associated with read or write of information (a program, data or the like) from or to a removable medium 216 mounted to the drive 215. The removable medium 216 may be any type recording medium. For example, the removable medium 216 may be a magnetic disc, an optical disc, a magneto-optical disc, a semiconductor memory or the like. For example, the drive 215 reads out the information (the program, the data or the like) stored in the removable medium 216 mounted to the drive 215, and supplies that information to the CPU 201, the RAM 203 or the like. In addition, for example, the drive 215 acquires the information (the program, the data or the like) supplied from the CPU 201, the RAM 203 or the like, and writes that information to the removable medium 216 mounted to the drive 215.

<Functional Block of Controller>

Figure 5:
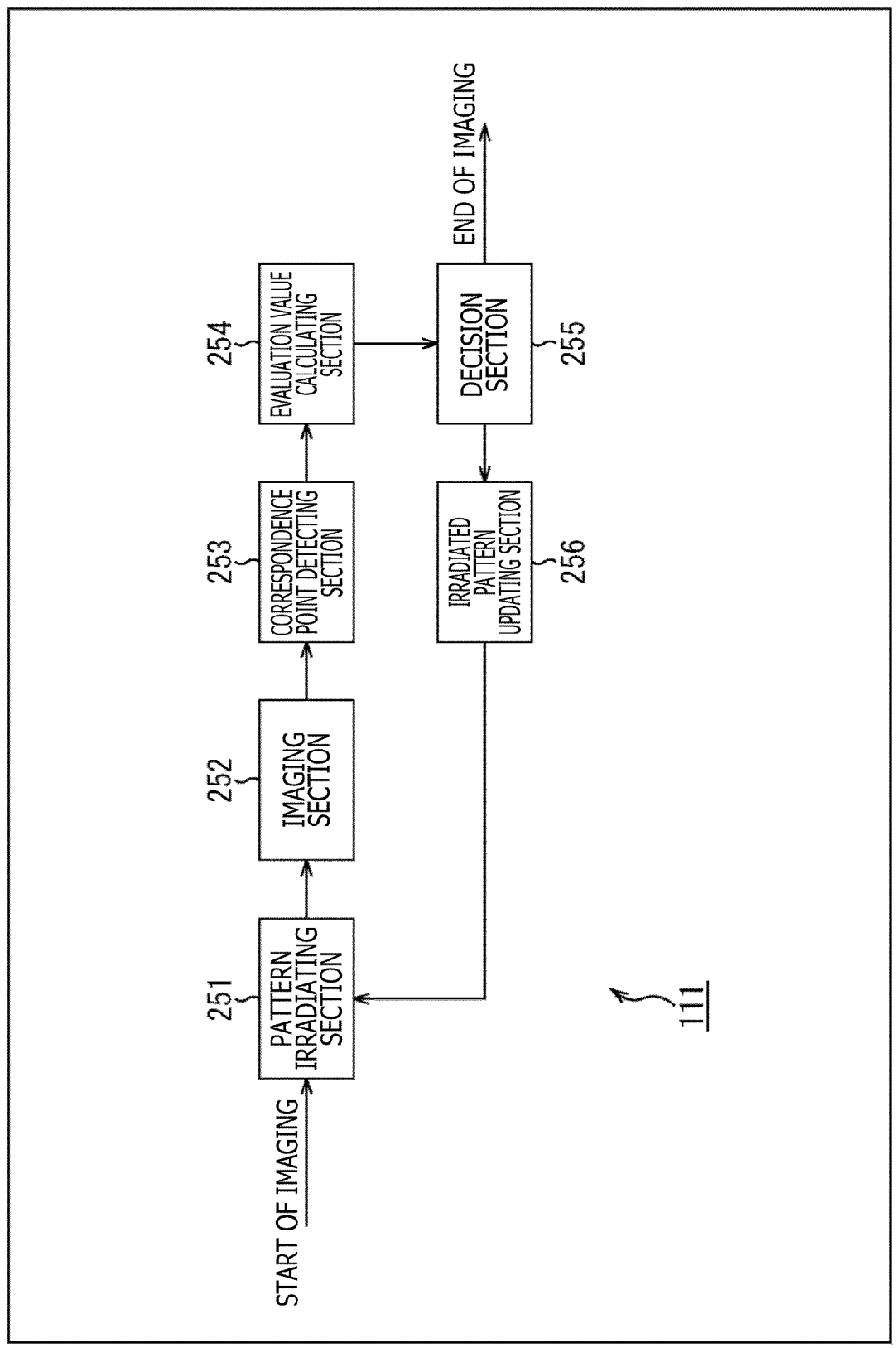
FIG. 5 is a functional block diagram depicting an example of a function which the central processing unit realizes.

FIG. 5 is a functional block diagram depicting an example of a function which the CPU 201 or the like of the central processing unit 111 executes the program or the like to realize. As depicted in FIG. 5, the central processing unit 111 has functions of a pattern irradiating section 251, an imaging section 252, a correspondence point detecting section 253, an evaluation value calculating section 254, a decision section 255, and an irradiation pattern updating section 256 by executing a program.

The pattern irradiating section 251 executes processing associated with the irradiation of the pattern image. The imaging section 252 executes processing associated with the control for the imaging apparatuses 113. The correspondence point detecting section 253 executes processing associated with the detection of the correspondence point between the imaged images obtained in the imaging apparatuses 113. The evaluation value calculating section 254 executes processing associated with the calculation of the evaluation value with which the occurrence rate of the error of the alignment when the imaged images are composed with each other is evaluated with respect to the detection results of the correspondence point. The decision section 255 performs the decision associated with the update of the pattern image based on the evaluation value. The irradiated pattern updating section 256 executes processing associated with the update of the irradiated position of the pattern image.

<Flow of Alignment Processing>

The central processing unit 111 as described above executes the alignment processing, thereby determining the irradiated position of the pattern image used in the alignment between the imaged images. An example of a flow of such alignment processing will be described with reference to a flow chart of FIG. 6.

When the alignment processing is started, in Step S101, the pattern irradiating section 251 causes the pattern to be irradiated to an imaging environment by controlling the irradiation device 112. The irradiation device 112 irradiates the laser beam to the imaging environment in accordance with the control by the pattern irradiating section 251 to draw the pattern image in the imaging environment. It should be noted that the imaging environment means a subject or the like within an imaging range (i.e., included in the imaged image). The subject or the like is some sort of object, for example, including a wall, a floor, a ceiling, a human being, or an animal within the imaging range. Incidentally, for example, in the case where it is difficult to normally irradiate the pattern image to the subject such as the case where the laser beam does not reach the subject like the sky, the distant view or the like, an object to which the laser beam can be normally irradiated may be arranged in the vicinity of or in front of the original subject, and the laser beam may be irradiated to the object of interest to draw the pattern image on the object.

In Step S102, the imaging section 252 controls all the imaging apparatuses 113 to cause all the imaging apparatuses 113 to image all points of view. Here, the point of view indicates the imaging range of one imaging apparatus 113. In other words, each of the imaging apparatuses 113 performs the imaging in accordance with the control by the imaging section 252 to obtain the data associated with the imaged image (imaged image data). Each of the imaging apparatuses 113 supplies the imaged image data to the central processing unit 111. As a result, the imaged image data associated with all the points of view (the entire imaging range) is obtained.

In Step S103, the correspondence point detecting section 253 selects the processing target point-of-view, that is, the imaged image as the processing target. In Step S104, the correspondence point detecting section 253 performs the detection of the correspondence point with the pattern as a clue with respect to the images between the adjacent points-of-view. In other words, the correspondence point detecting section 253 detects the correspondence point (the pattern which exists in each of the imaged images) based on the pattern images included in the respective imaged images between the imaged image of the processing target point-of-view, and the imaged image of a point of view adjacent to the processing target point-of-view.

Figure 7B:
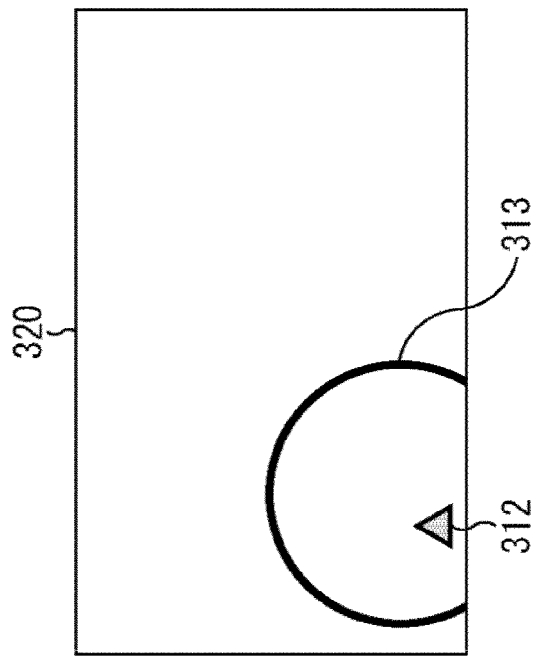
FIGS. 7A and 7B are views depicting an example of an imaged image.
Figure 7A:
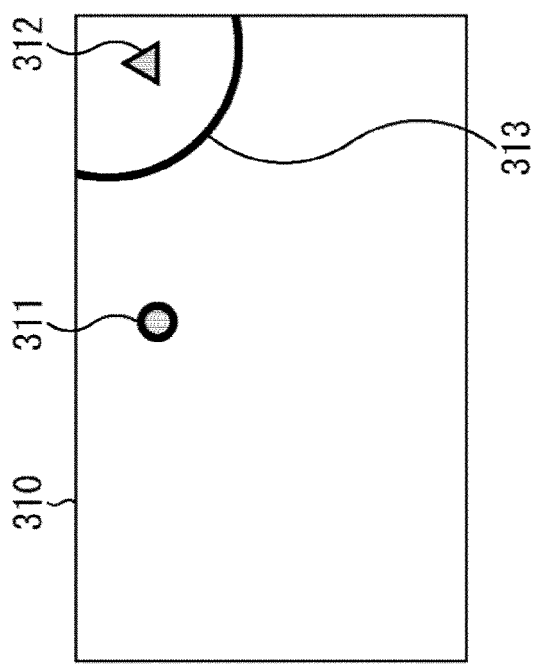

For example, it is assumed that an imaged image 310 of FIG. 7A is the imaged image of the processing target point-of-view, and an imaged image 320 of FIG. 7B is the imaged image of the point of view adjacent to the processing target point-of-view. The imaged image 310 of FIG. 7A includes a pattern 311 and a pattern 312 which are obtained through the irradiation by the irradiation device 112, and an edge 313. The edge 313 is a pattern of a subject (e.g., the wall 120). It is also assumed that a portion other than the circular edge 313 is a flat portion in which a change in pixel value is sufficiently small. In addition, the imaged image 320 of FIG. 7B includes the pattern 312 which is obtained through the irradiation by the irradiation device 112, and the edge 313.

In the detection of the correspondence point, in general, an edge section in which a luminance value largely changes becomes a feature, and the alignment is performed on the basis of the feature. In other words, in the case where there are many flat portions in the imaged image, since there are a small number of features of the imaged image, it is possible that the alignment becomes more difficult to perform.

Figure 8:
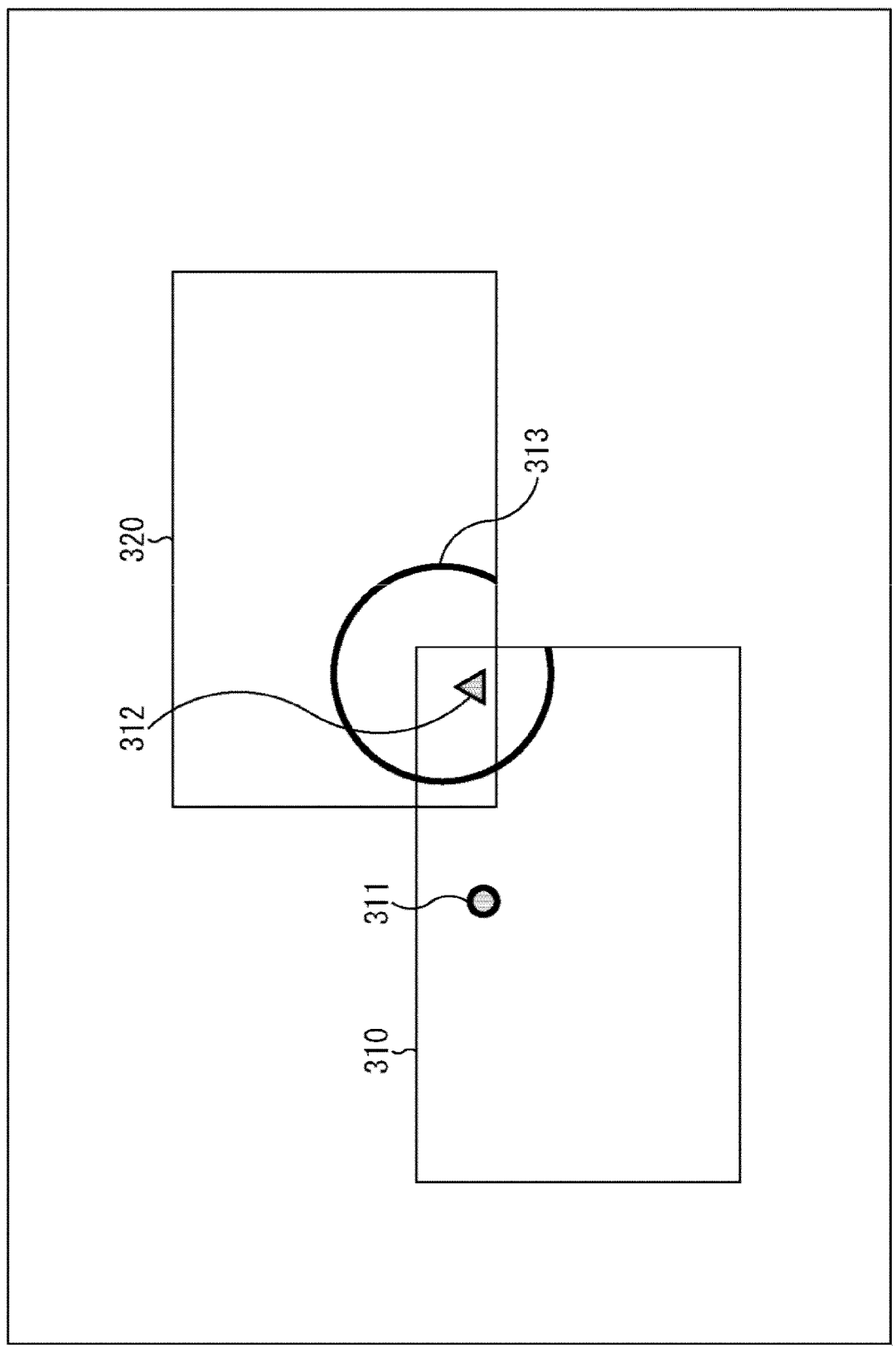
FIG. 8 is a view depicting an example of alignment.

For example, when the correspondence point detecting section 253 performs the detection of the correspondence point between the imaged image 310 and the imaged image 320 of FIGS. 7A and 7B, the alignment is performed on the basis of the pattern 312 and the edge 313 included in both the imaged images. In this case, for example, it is assumed that the alignment, for example, is performed in the manner as depicted in FIG. 8. However, it might be right that as depicted in an example of FIG. 9, the alignment of the imaged image 320 is performed at a tilt with respect to the imaged image 310. In such a manner, it is difficult to specify a difference in direction of the imaged image 320 on the basis of the small number of features (the pattern 312 and the edge 313) in some cases.

Then, in Step S105, the evaluation value calculating section 254 calculates an evaluation value with which the occurrence rate of the error of the alignment when the imaged images are composed with each other is evaluated with respect to the detection result of the correspondence point obtained in the processing of Step S104.

Then, in Step S106, the decision section 255 reserves the addition of the pattern which is to be irradiated to the processing target point-of-view in response to the evaluation value obtained in the processing of Step S105. The evaluation value may be any value (function). For example, however, it is assumed that the larger the evaluation value, the lower the possibility (occurrence rate of error) that the alignment becomes the error, and the smaller the evaluation value, the higher the possibility that the alignment becomes the error. In this case, the decision section 255 decides that the possibility that the alignment becomes the error is sufficiently low in the case where the evaluation value is equal to or larger than a predetermined threshold value, and decides that the possibility that the alignment becomes the error is high in the case where the evaluation value is smaller than the predetermined threshold value. Then, in the case where the decision section 255 decides that the possibility that the alignment becomes the error is high, the decision section 255 increases the number of patterns in the area of the processing target point-of-view for which the possibility that the alignment becomes the error is decided to be high, that is, the irradiation pattern updating section 256 is requested so as to irradiate the additional pattern image to the area of interest. Contrary to this, with respect to the area for which the possibility that the alignment becomes the error is decided to be low, the addition of the pattern is not required.

In addition, in Step S107, the decision section 255 reserves the erasure of the pattern unnecessary for the alignment. The reason for this is because the pattern image which does not overlap any of other imaged images and does not contribute to the alignment is unnecessary. Therefore, the decision section 255 requests the irradiated pattern updating section 256 to erase such a pattern.

The pattern image is an image added for the alignment and is an image unnecessary for appreciating the original imaged image. In other words, it can be said that the pattern image reduces the subjective image quality for a viewer of the imaged image. Therefore, the pattern image which is unnecessary for the appreciation of the imaged images as described above is erased (so as not to irradiate the unnecessary pattern), thereby enabling the reduction of the image quality of the imaged image to be reduced.

Figure 9:
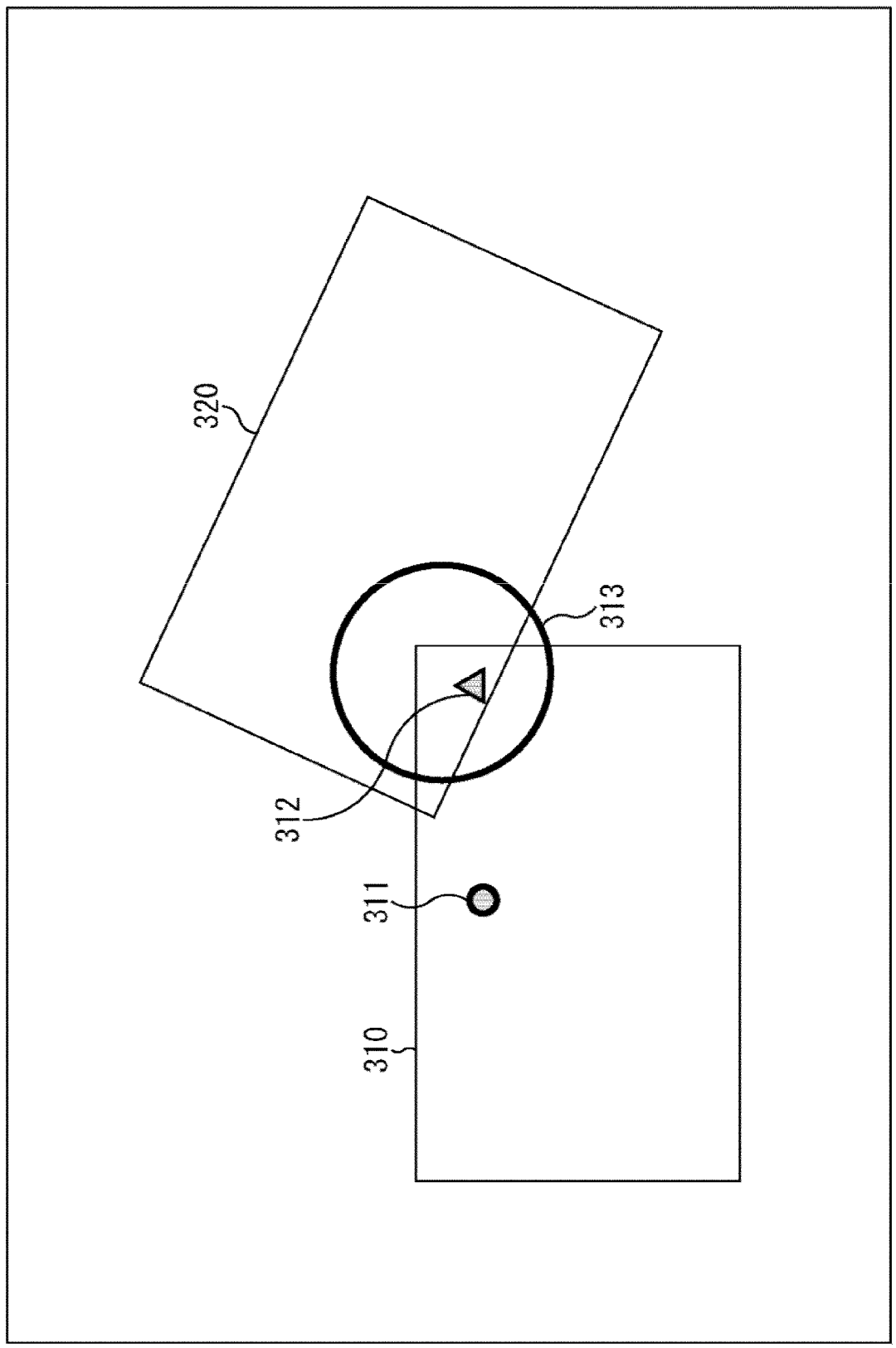
FIG. 9 is a view depicting another example of the alignment.
Figure 10B:
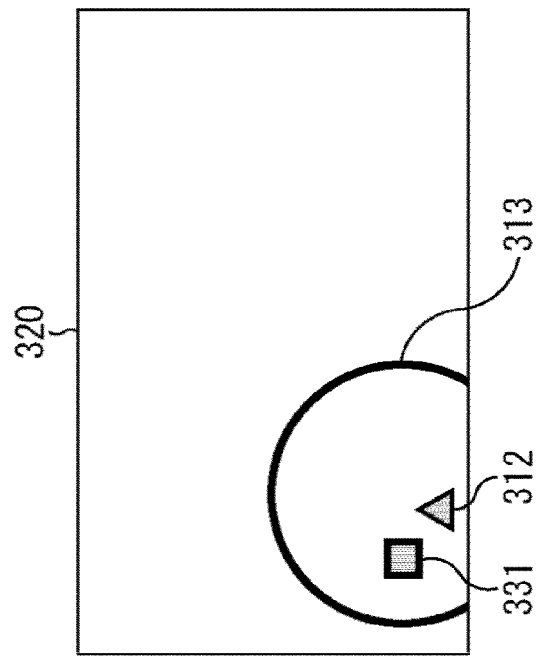
FIGS. 10A and 10B are views depicting another example of the imaged image.
Figure 10A:
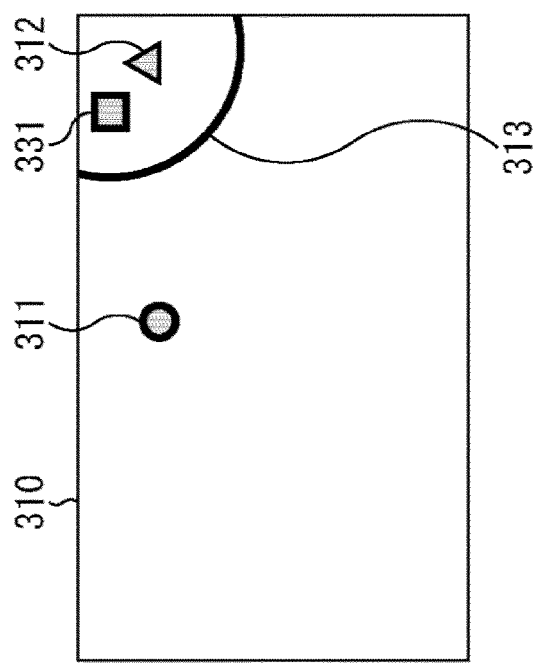

In other words, the number of patterns which are to be irradiated to the area in which the possibility (occurrence rate of error) that the error occurs in the alignment when the imaged images are composed with each other is high is increased, and the detection of the correspondence point starts over again. For example, a new pattern 331 (FIGS. 10A and 10B) is added to the vicinity of the pattern 312 which have been described with reference to FIGS. 7A, 7B, 8, and 9. In such a situation, the imaging (Step S102) is performed again, whereby as depicted in FIG. 10A, the pattern 331 is added to the imaged image 310. Likewise, as depicted in FIG. 10B, the pattern 331 of interest is also added to the imaged image 320. Therefore, since as depicted in FIG. 11, the alignment can be performed on the basis of the pattern 312, the edge 313, and the pattern 331, the direction of the imaged image 320 described above can also be readily specified, and the alignment can be more accurately performed.

It should be noted that the alignment described with reference to FIGS. 7A, 7B, 8, 9, 10A, 10B, and 11 is merely an example, and the way of the alignment, the number of patterns or edges, the shape, the position, the size, and the like are all arbitrary. In general, since an increase of the number of patterns results in an increase of the number of features, the number of errors in the alignment (matching) between the imaged images is made more likely to be reduced. In other words, the matching comes to be able to be more accurately performed.

It should be noted that the way of increasing the number of patterns is arbitrary. That is, the new pattern may be irradiated, the pattern irradiated to other area may be moved to the area in which the possibility of the occurrence rate of the error is high in the alignment. In the case where the pattern is moved, it is desirable to select the pattern to be moved so as to suppress an influence exerted on the alignment of other area. In other words, the pattern which exerts a less influence on the alignment even if being moved (or erased) may be specified, and may be moved. For example, the pattern which is decided not to contribute to the alignment by the processing in Step S107 may be moved. For example, the addition and movement of the pattern may be combined with each other. For example, in the case where an upper limit is present in the number of patterns which the irradiation device 112 irradiates, the patterns may be added up to the upper limit, and in the case where the number of patterns reaches the upper limit, the pattern being irradiated may be moved.

In Step S108, the correspondence point detecting section 253 decides whether or not the processing for all the points of view has been ended. In the case where it is decided that the unprocessed point of view is present, the processing returns back to Step S103, and the pieces of processing in and after Step S103 are executed. In the case where the pieces of processing of Step S103 to Step S108 are executed with respect to all the points of view and it is decided in Step S108 that the processing for all the points of view has been ended, the processing proceeds to Step S109.

In Step S109, the irradiation pattern updating section 256 decides whether or not a point of view in which the pattern to be updated is present. In other words, after the processing has been executed for all the points of view in the manner as described above, the irradiation pattern updating section 256 decides whether or not the processing of Step S106 or the processing of Step S107 is executed in the processing for all the points of view. In the case where it is decided that the processing of Step S106 or the processing of Step S107 is executed in the processing for all the points of view, the processing proceeds to Step S110. In Step S110, the irradiation pattern updating section 256 updates the pattern which is to be irradiated to each of the points of view in accordance with the reservation performed in Step S106 and Step S107 (the addition, the movement, the erasure or the like of the pattern). In other words, in the case where the evaluation value is set to the value representing that the occurrence rate of the error is higher than the predetermined threshold value, the irradiation pattern updating section 256 updates the irradiated position of the pattern so as to increase the number of patterns to be irradiated to the area in which the imaged image in the point of view as the processing target and other imaged image overlap each other. In addition, the irradiation pattern updating section 256 erases the pattern which is decided to be unnecessary. When the processing in Step S110 is ended, the processing returns back to Step S101 and the processing in and after the processing in Step S101 is executed. In other words, the pattern image is irradiated to the updated position, and the imaging is performed again. The processing in and after Step S101 is executed for the new imaged image, in other words, the imaged image including the pattern image for which the irradiated position is updated.

Until the position of the pattern image comes not to be updated in such a manner, the pieces of processing of Step S101 to Step S110 are repetitively executed. Then, in the case where it is decided in Step S109 that the point of view for which the pattern to be updated is absent, the alignment processing is ended.

By executing the alignment processing in the manner as described above, the alignment between the imaged images can be more accurately performed.

<Method of Calculating Evaluation Value>

Figure 6:
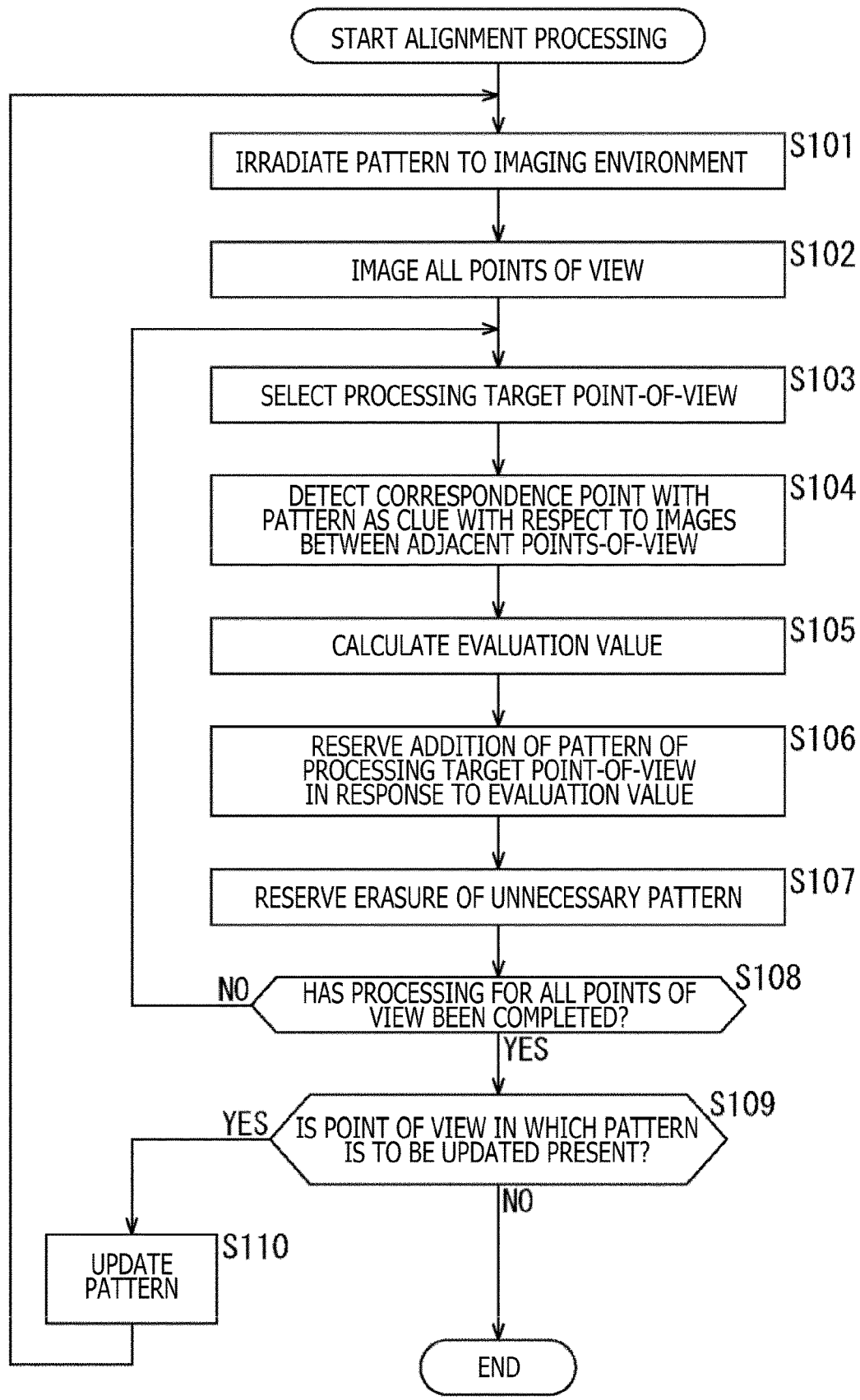
FIG. 6 is a flow chart explaining an example of a flow of alignment processing.
Figure 12:
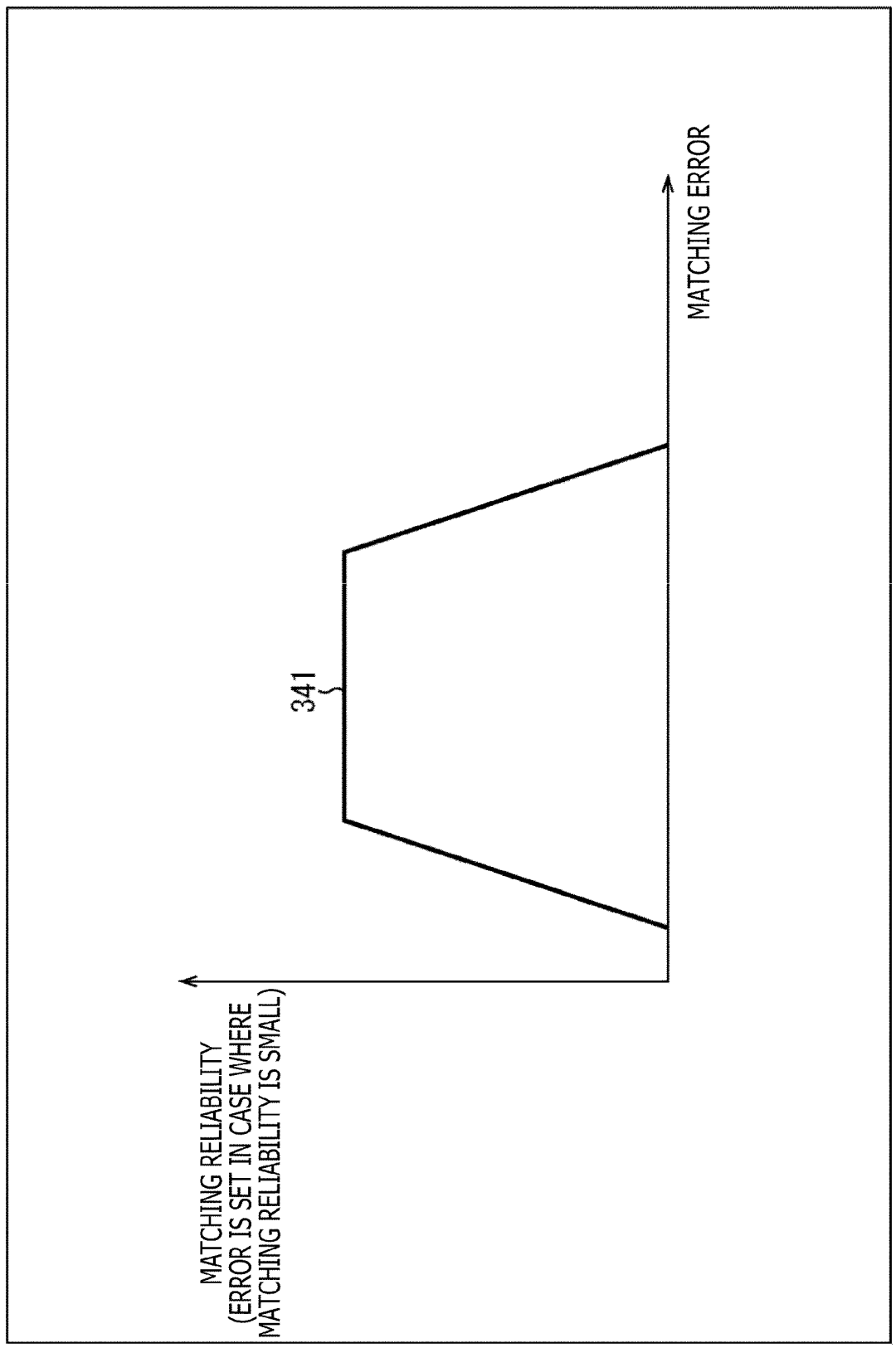
FIG. 12 is a view explaining an evaluation value.

The method of calculating the evaluation value in Step S105 of FIG. 6 is arbitrary. For example, the evaluation value may be obtained on the basis of the detection result of the correspondence point (matching error). An example between the matching error and the matching reliability is depicted in FIG. 12 by a curved line 341. The matching error is a parameter indicating magnitude of a result of comparison (difference) between both the imaged images which are aligned on the basis of the result of the detection of the correspondence point (Step S104). As the value becomes larger, the value represents that both the images which are aligned do not agree with each other (there is much disagreement).

The matching reliability is a parameter indicating the reliability, but the alignment succeeds, depending on the matching error. The larger this value, the higher the possibility that the alignment (matching) based on the detection result of the correspondence point leads to the proper alignment result. For example, in the case where the alignment result of the imaged images of FIGS. 7A and 7B becomes the state as depicted in FIG. 8, the larger the matching reliability, the higher the possibility that the state of FIG. 8 is a state of the proper alignment. It should be noted that the matching reliability may be made a parameter indicating the reliability, that the alignment succeeds, depending on the matching error. In this case, for example, if the state of FIG. 9 is the state of the proper alignment, then, the higher the matching reliability, the higher the possibility that the result of the alignment between the imaged images of FIGS. 7A and 7B does not become the state as depicted in FIG. 8, but becomes the state as depicted in FIG. 9.

The evaluation value is set in response to the value of the matching reliability. In other words, as the matching reliability is larger, the evaluation value is set to the value (e.g., the larger value) representing that the rate of the error occurrence is lower. Contrary to this, as the matching reliability is smaller, the evaluation value is set to the value (e.g., the smaller value) representing that the rate of the error occurrence is higher.

In general, since the number of disagreement increases, the possibility that the matching result is right is reduced. Therefore, in case of the curved line 341 of an example of FIG. 12, when the matching error exceeds a predetermined first threshold value, the larger the value of the matching error, the lower the matching reliability. In addition, in general, in the case where the number of features of the image is small, the matching becomes easy to perform as compared with the case where the number of features of the image is large, and the number of matching errors is reduced. However, since the more alignments can be performed as a result of the matching result, the possibility that the resulting matching result is the right result is reduced. In other words, in the case where the matching error is too small, the matching reliability is reduced. Therefore, in case of the curved line 341 of the example of FIG. 12, when the matching error is smaller than a predetermined second threshold value smaller than the predetermined first threshold value described above, the smaller the value of the matching error, the lower the matching reliability. In other words, regardless of the matching error is larger or smaller than a predetermined range (ranging between the first threshold value and the second threshold value), the matching reliability becomes lower than the case where the matching error is within the predetermined range. In other words, the evaluation value is set to a value representing that the occurrence rate of the error is higher.

In this case, for example, in the case where the matching is performed in a partial area including a pattern to which attention is paid, and as a result, the matching error is too large, it is estimated that both images aligned with each other do not agree with each other (there is much disagreement). On the other hand, when the matching error is too small, it is estimated that there are many flat portions (the number of features is small). By adopting such a process, the pattern is enabled to be updated in the case where it is decided that the possibility that the number of features is small, and thus the right matching is not performed is high as well as in the case of the disagreement. Therefore, as described above, the alignment between the imaged images can be more properly performed. It should be note that a relationship between the matching error and the matching reliability (curved line 341) is arbitrary and is by no means limited to the example of FIG. 12.

In addition, for example, the evaluation value may be obtained on the basis of the detection result of the correspondence point (matching error), and a feature amount of image of the partial area in which the detection of the correspondence point is performed. A curved line 342 of FIG. 13A depicts an example of a relationship between the matching error and the matching reliability in this case. In addition, a curved line 343 of FIG. 13B depicts an example of a relationship between the feature amount of image, and flatness reliability. Although the feature amount of image is arbitrary, for example, the feature amount of image may also be caused to be a parameter associated with the dispersion of the pixel values (a parameter associated with the flatness). The parameter associated with the dispersion of the pixel values is arbitrary. For example, the parameter may be a value associated with DR, or a sum of absolute values of adjacent pixels differences, or the like. In this case, the smaller the feature amount of image (the dispersion of the pixel values), the higher the flatness.

In addition, the flatness reliability is a parameter indicating the reliability that the alignment succeeds depending on the flatness (magnitude of the dispersion of the pixel values) (a parameter indicating the magnitude of the reliability that the alignment succeeds depending on the flatness). Similarly to the case of the matching reliability, as this value becomes larger, the possibility that the alignment (matching) based on the detection result of the correspondence point becomes the proper alignment result becomes high. It should be noted that the flatness reliability may be set as a parameter indicating the magnitude of the possibility that the alignment succeeds depending on the flatness.

The evaluation value is set to a value corresponding to the product of the matching reliability and the flatness reliability. In other words, as the product of the matching reliability and the flatness reliability is larger, the evaluation value is set to a value (e.g., a larger value) indicating that the occurrence rate of the error is lower. On the other hand, as the product of the matching reliability and the flatness reliability is smaller, the evaluation value is set to a value (e.g., a smaller value) indicating that the occurrence rate of the error is higher.

In case of the curved line 342 of the example of A of FIG. 13A, when the matching error exceeds a predetermined threshold value, the larger the value of the matching error, the lower the matching reliability. In addition, as described above, in general, in the case where the number of features of the image is small, the possibility that the matching result is the proper result is reduced. In other words, the larger the flatness (the higher the flat possibility, or the more the flatness), the lower the flatness reliability. For example, in case of the curved line 343 of FIG. 13B, when a feature amount of image is smaller than the predetermined threshold value, the smaller the value of the feature amount of image, the lower the flatness reliability. Therefore, even if the matching error is small, when the area in which the matching is performed is flat, it is decided that the possibility that the error occurs is high in the alignment. Thus, the evaluation value is set to a value indicating that the occurrence rate of the error is higher.

Therefore, as described above, the alignment between the imaged images can be more accurately performed. It should be noted that instead of calculating the product of the matching reliability and the flatness reliability in the manner as described above, as depicted in FIG. 13C, the evaluation value may be obtained from the value of the matching error and the value of the feature amount of image on the basis of a relationship among the previously determined matching error, the feature amount of image (e.g., the parameter associated with the dispersion of the pixel values) and the evaluation value.

It should be noted that the relationship (curved line 342) between the matching error and the matching reliability is arbitrary, and is by no means limited to the example of FIG. 13A. In addition, the relationship (curved line 343) between the feature amount of image and the flatness reliability is arbitrary, and is by no means limited to the example of FIG. 13B. Moreover, the relationship among the matching error, the feature amount of image, and the evaluation value is arbitrary, and is by no means limited to the example of FIG. 13C.

Figure 14B:
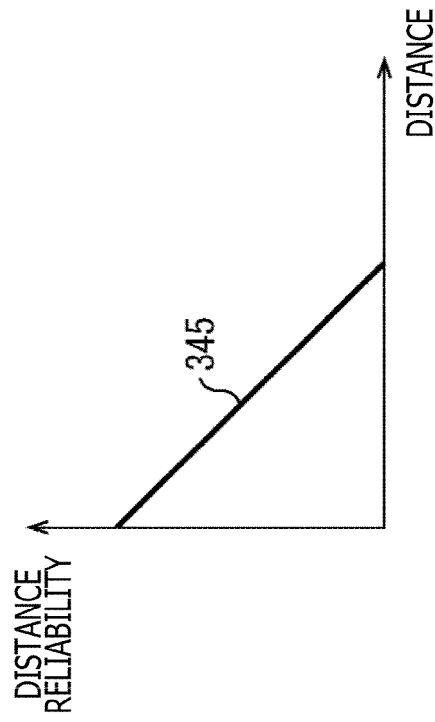
FIGS. 14A and 14B are still another views explaining the evaluation value.
Figure 14A:
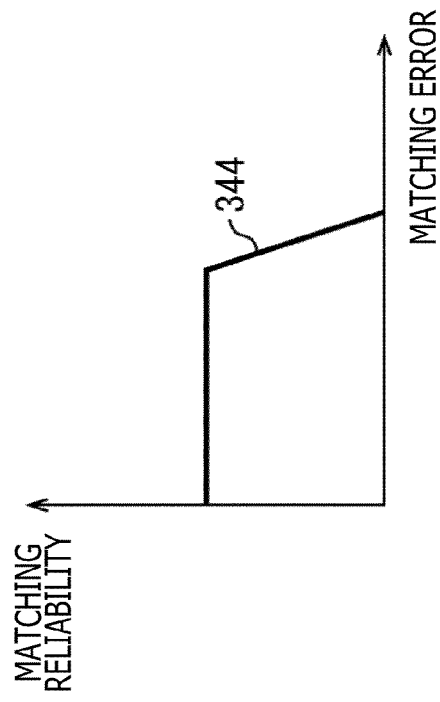

In addition, for example, the evaluation value may also be obtained on the basis of the detection result of the correspondence point (matching error), and the relative posture of the two imaging sections creating two imaged images, respectively, for which the alignment is performed after the imaging. A curved line 344 of FIG. 14A depicts an example of a relationship between the matching error and the matching relationship in this case. In addition, a straight line 345 of FIG. 14B depicts an example of a relationship between a distance and distance reliability.

The distance is information associated with the relative posture of the imaging sections (or the imaging ranges) imaging the correspondence point which are obtained by using the detected correspondence point. More specifically, the distance is a parameter indicating the magnitude of the error between the relative posture of the imaging sections (or the imaging ranges) based on the correspondence point, and the relative posture of the imaging sections (or the imaging ranges) in the real space. In other words, in the case where the distance is zero or sufficiently small, the correspondence points detected in the imaged images point to the same position on the real space as well, and the possibility that the alignment becomes the proper result is high. On the other hand, in the case where the distance is large, the correspondence points detected in the imaged images are shifted on the real space and the possibility of misdetection is high. That is, the possibility that the alignment becomes the proper result is low.

The distance reliability is a parameter indicating the reliability that the alignment succeeds depending on such a distance. As the value of the distance reliability is larger, the possibility that the alignment (matching) based on the detection result of the correspondence point becomes the proper alignment result becomes high. It should be noted that the distance reliability may be caused to be a parameter indicating the magnitude of the possibility that the alignment succeeds depending on the distance.

As described above, in general, the larger the distance, the lower the possibility that the alignment becomes the proper result. Therefore, the relationship between the distance and the distance reliability, for example, becomes a relationship like a straight line 345 of FIG. 14B.

Figure 15:
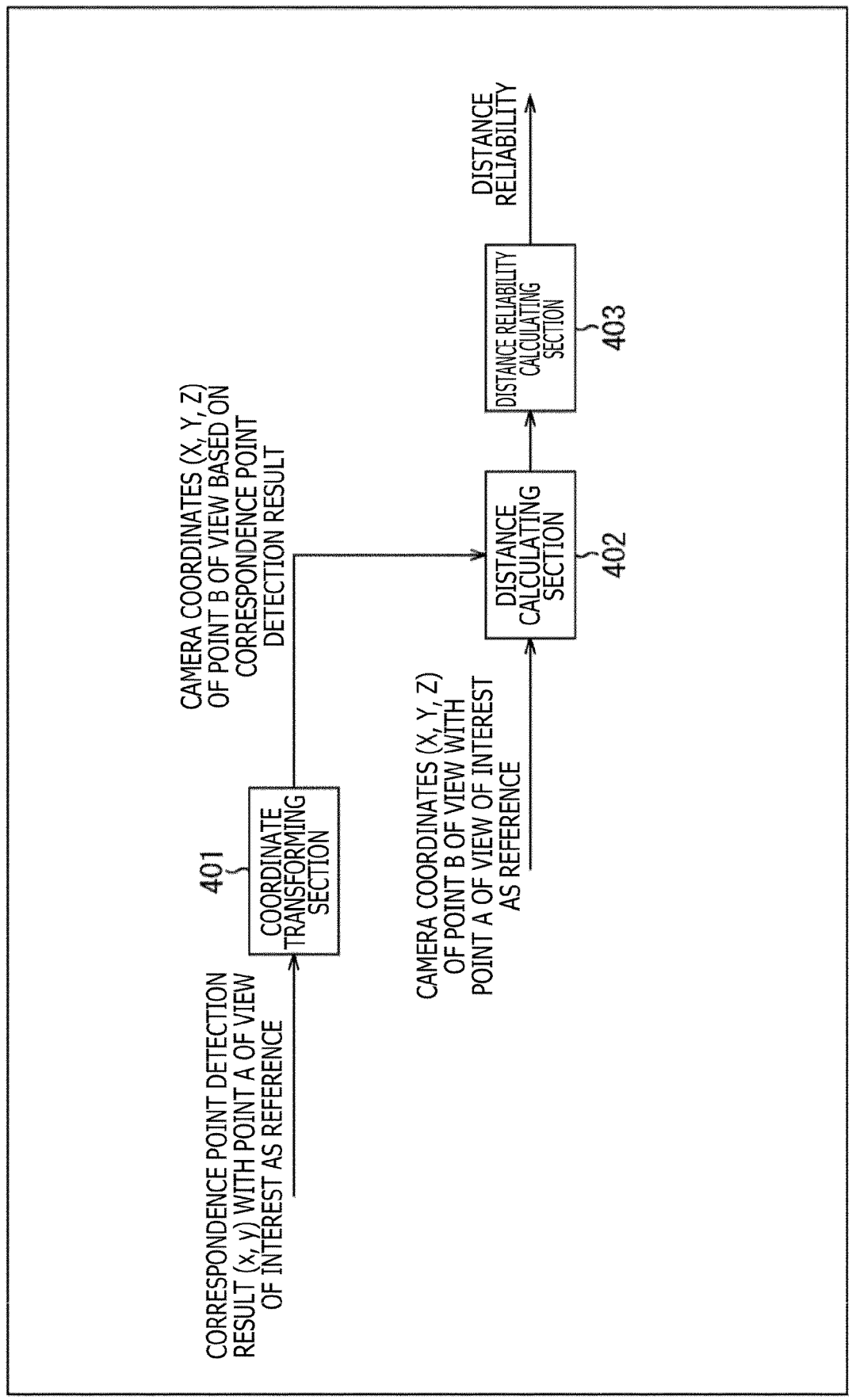
FIG. 15 is a block diagram depicting an example of a situation of distance reliability calculation.

A method of calculating the relationship between such a distance and distance reliability is arbitrary. For example, the relationship between such a distance and distance reliability may be calculated by using a functional block as depicted in FIG. 15. Firstly, it is assumed that the relative posture (position, direction, etc.) on the real space between the imaging apparatus 113 of the point A of view of interest, and the imaging apparatus 113 of the point B of view is known. In addition, the relative position in the intra-image coordinate system between the imaged images is known from the detected correspondence point.

A coordinate transforming section 401 transforms the relative position between the imaging apparatuses 113 of an image coordinate system (x, y) based on the correspondence point into a coordinate system (X, Y, Z) on the real space. A distance calculating section 402 calculates a distance (error) between the coordinates of the imaging apparatus 113, on the real space of the point B of view based on the detection result of the correspondence point, which are obtained by the coordinate transforming section 401, and the coordinates (known) of the imaging apparatus 113 on the real space of the point B of view with the point A of view of interest as the reference. A distance reliability calculating section 403 calculates the distance reliability on the basis of the distance calculated by the distance calculating section 402.

The evaluation value is set to a value corresponding to the product of the matching reliability and the distance reliability. In other words, as the product of the matching reliability and the distance reliability is larger, the evaluation value is set to a value (e.g., a larger value) indicating that the occurrence rate of the error is lower. On the other hand, as the product of the matching reliability and the distance reliability is smaller, the evaluation value is set to a value (e.g., a smaller value) indicating that the occurrence rate of the error is higher.

In case of the curved line 344 of the example of FIG. 14A, when the matching error exceeds the predetermined threshold value, the larger the value of the matching error, the lower the matching reliability. In addition, in case of the curved line 345 of the example of FIG. 14B, as the distance is large, the distance reliability becomes low. Therefore, even if the matching error is small, then, when the error between the relative posture of the imaging sections (or the imaging ranges thereof) based on the correspondence points, and the relative posture of the imaging sections (or the imaging ranges thereof) in the real space is large, the possibility that the error occurs in the alignment is decided to be high, and the evaluation value is set to the value indicating that the occurrence rate of the error is high.

Therefore, as described above, the alignment between the imaged images can be more accurately performed. It should be noted that instead of calculating the product of the matching reliability and the distance reliability in the manner as described above, the evaluation value may be obtained from the value of the matching error and the value of the feature amount of image on the basis of the relationship among the predetermined matching error, the distance, and the evaluation value.

It should be noted that a relationship (curved line 344) between the matching error and the matching reliability is arbitrary and is by no means limited to the example of FIG. 14A. In addition, the relationship (curved line 345) between the distance and the distance reliability is arbitrary and is by no means limited to the example of FIG. 14B.

<Pattern Moving Method and Correspondence Point Detecting Method>

In the case where the number of patterns is increased as described above, for example, there is considered a method of moving the pattern being irradiated, or a method of adding the pattern to be irradiated. In the case where the pattern is moved, the pattern irradiated to the imaging range of the processing target point-of-view (in other words, the pattern included in the imaged image as the processing target). In other words, the irradiated position of other pattern included in the imaged image as the processing target may be moved to an area in which the imaged images are superimposed on each other, and the evaluation value is the value indicating that the occurrence rate of the error is higher.

In addition, the pattern irradiated to the outside of the imaging range of the processing target point-of-view (in other words, the pattern not included in the imaged image as the processing target) may be moved. In other words, the irradiated position of other pattern irradiated to the position not included in the imaged image as the processing target may be moved to the area in which the imaged images are superimposed on each other, and the evaluation value is the value indicating that the occurrence rate of the error is higher.

In the case where the pattern is moved within the imaged image, since the pattern can be updated without waiting for the processing for other imaged image, the pattern can be more readily updated. In addition, in the case where the pattern is moved from the outside of the imaged image, since the pattern image can be moved in the wider range, more patterns can be concentrated on the area in which the alignment is more difficult to perform and the alignment between the imaged images can be more accurately performed.

In addition, the detection of the correspondence point may be performed on the basis of the newest pattern irradiation, or the detection of the correspondence point may be performed on the basis of the multiple times of pattern irradiation, that is, by using not only the newest pattern image, but also the pattern image irradiated in the past.

In the case where the correspondence point is detected on the basis of the newest pattern, the correspondence point can be more readily detected (an increase in load or an increase in processing time can be suppressed). In addition, since the correspondence point is detected by utilizing the past pattern, resulting in that since the correspondence point can be detected by using more patterns, the alignment between the imaged images can be more accurately performed.

It should be noted that the method of moving the pattern, and method of detecting the correspondence point described above, for example, as depicted in Table of FIG. 16, can be used in the form of arbitrary combination.

For example, in the case where the patterns is moved within the imaged image as the processing target and the correspondence point is detected on the basis of the newest pattern, the pattern may be irradiated again to the area for which the possibility of the error is large with respect to the evaluation value for the detection of the correspondence point. In addition, for example, in the case where the pattern is moved within the imaged image as the processing target and the correspondence point is detected by utilizing the past pattern as well, the pattern may be irradiated to the area for which the possibility of the error is decided to be large with respect to the evaluation value for the detection of the correspondence point, and the updated pattern irradiation result may be superimposed on the last pattern irradiation result to increase the number of patterns used as the clue, thereby recalculating the detection of the correspondence point.

In addition, for example, in the case where the pattern is moved from the outside of the imaged image as the processing target, and the correspondence point is detected on the basis of the newest pattern, the pattern may be added to the area for which the possibility of the error is decided to be large with respect to the evaluation value for the detection of the correspondence point. In addition, for example, in the case where the pattern is moved from the outside of the imaged image as the processing target, and the correspondence point is detected by utilizing the past pattern as well, the pattern may be added to the area for which the possibility of the error is decided to be large with respect to the evaluation value for the detection of the correspondence point, and the updated pattern irradiation result may be superimposed on the last pattern irradiation result to increase the number of patterns used as the clue, thereby recalculating the detection of the correspondence point.

It should be noted that in the pattern update, the shape of the pattern may be changed. For example, a circular pattern may be changed to a polygon with which the posture of the pattern is distinguishable (e.g., a triangle or a quadrangle) in the detection of the correspondence point.

<Pattern Image>

It should be noted that the irradiation device 112 may irradiate any light as long as the pattern image can be irradiated to the subject or the like with the light. For example, a projector (projection device) may be used as the irradiation device 112, and the light may be projected in the wide range. In this case, for example, a plurality of pattern images may be irradiated by using one projected image. It should be noted that as described above, the irradiation device 112 irradiates the laser beam, resulting in that the pattern image can be more clearly irradiated to a longer distance subject or the like.

In addition, a wavelength region of the light with which the pattern image is irradiated is arbitrary, and visible light may be used or non-visible light may be used. For example, infrared light may be used. In this case, it is only necessary that the imaging apparatus 113 can receive both the visible light and the infrared light.

For example, the imaging apparatus 113 having an image sensor including a color filter 501 having the Bayer array as depicted in FIG. 17A, and the imaging apparatus 113 having an image sensor including an IR filter 502 for the infrared light are both prepared. In this case, the imaged image of the visible light may be obtained from one imaging apparatus 113, and the pattern image of the infrared light may be detected by the other imaging apparatus 113. In this case, it is only necessary that the alignment is performed between using the imaged image of the visible light and the imaged image of the infrared light which are obtained in both the imaging apparatuses 113, respectively, and after both the imaged images are superimposed on each other, the detection of the correspondence point is performed.

It should be noted that a configuration may be adopted such that one imaging apparatus 113 has an image sensor including a filter 503 in which, for example, a color filter for the visible light and the filter for the infrared light as depicted in FIG. 17C are combined with each other, and the creation of the imaged image of the visible light, and the detection of the infrared light are both performed. In this case, the alignment is unnecessary. If necessary, the visible light (RGB) and a component of IR may be separated from each other depending on the wavelength region. As depicted in FIG. 17D, in the RGB component and the IR component, the wavelength regions are different in respective peaks from each other. In FIG. 17D, a curved line 511 indicates a spectrum of the B component, a curved line 512 indicates a spectrum of the G component, a curved line 513 indicates a spectrum of the R component, and a curved line 514 indicates a spectrum of the IR component.

Therefore, for example, the separation of the IR component included in the RGB image has only to be performed in accordance with following Equation (1).

$$IR' = IR - (wr*R + wg*G + wb*B) \qquad (1)$$

In addition, the separation of the RGB components included in the IR image has only to be performed in accordance with following Equation (2).

$$R' = R - wir*IR \text{ (this also applies to } G' \text{ and } B') \qquad (2)$$

Moreover, a distance to a subject or the like to which the pattern is irradiated may be measured by a ToF (Time Of Flight) sensor. In this case, in addition to the pattern irradiation, a depth is measured, which can be utilized in the improvement in the accuracy of the matching.

3. Second Embodiment

<Other Configurations>

It should be noted that the configuration of the imaging system to which the present technology is applied is by no means limited to the example of FIG. 3 described above. For example, the central processing unit 111, the irradiation device 112, and the imaging apparatus 113 are arbitrary in number. For example, a plurality of central processing units 111, and a plurality of irradiation devices 112 may be adopted, the number of imaging apparatuses 113 may be three or less, or five or more.

Figure 18:
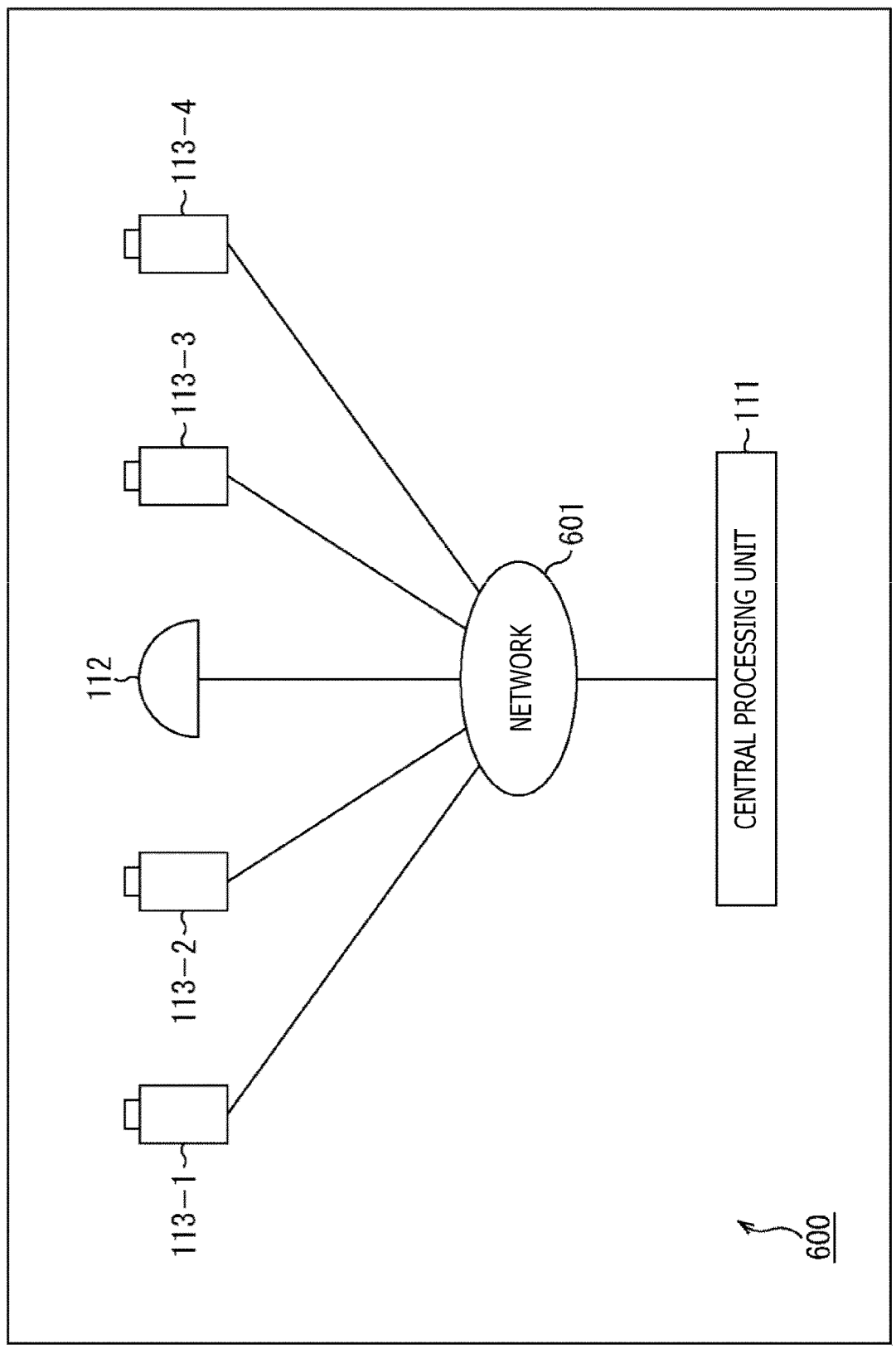
FIG. 18 is a block diagram depicting another example of the configuration of the imaging system.

For example, like an imaging system 600 depicted in FIG. 18, the central processing unit 111, the irradiation device 112, and the imaging apparatuses 113 may be connected to one another via a network 601.

The network 601 is an arbitrary communication network. A communication method adopted in the network 601 is arbitrary. For example, wired communication may be adopted, wireless communication may be adopted, or both the wired communication and the wireless communication may be adopted. In addition, the network 601 may include a single communication network, or may include a plurality of communication networks. For example, a communication network or a communication channel, complying with an arbitrary communication standard, such as the Internet, a public telephone line network, a wide area communication network for a wireless mobile object such as a so-called 3G line or 4G line, a WAN (Wide Area Network), a LAN (Local Area Network), a wireless communication network performing communication complying with a Bluetooth (registered trademark) standard, a communication channel of a short-range wireless communication such as NFC (Near Field Communication), a communication channel of infrared communication, or a communication network of wired communication complying with the standard such as an HDFI (registered trademark) (High-Definition Multimedia Interface) or a USB (Universal Serial Bus) may be included in the network 601.

The central processing unit 111, the irradiation device 112, and the respective imaging apparatuses 113 are communicably connected to the network 601. It should be noted that the connection may be a wired style (i.e., connection via wired communication), may be a wireless style (i.e., connection via wireless communication), or may be both styles. It should be noted that the number of apparatuses, a shape, a size, an arrangement position or the like of a chassis is arbitrary.

The central processing unit 111, the irradiation device 112, and the respective imaging apparatuses 113 can communicate (perform the exchange or the like of information) with one another via the network 601. In other words, the central processing unit 111, the irradiation device 112, and the respective imaging apparatuses 113 may be connected communicably with one another via other facilities (an apparatus, a transmission path and the like).

Similarly to the case of the imaging system 100 described above, the present technology can also be applied to the case of the imaging system 600 having such a configuration, and the action and effects described can be offered.

Figure 19:
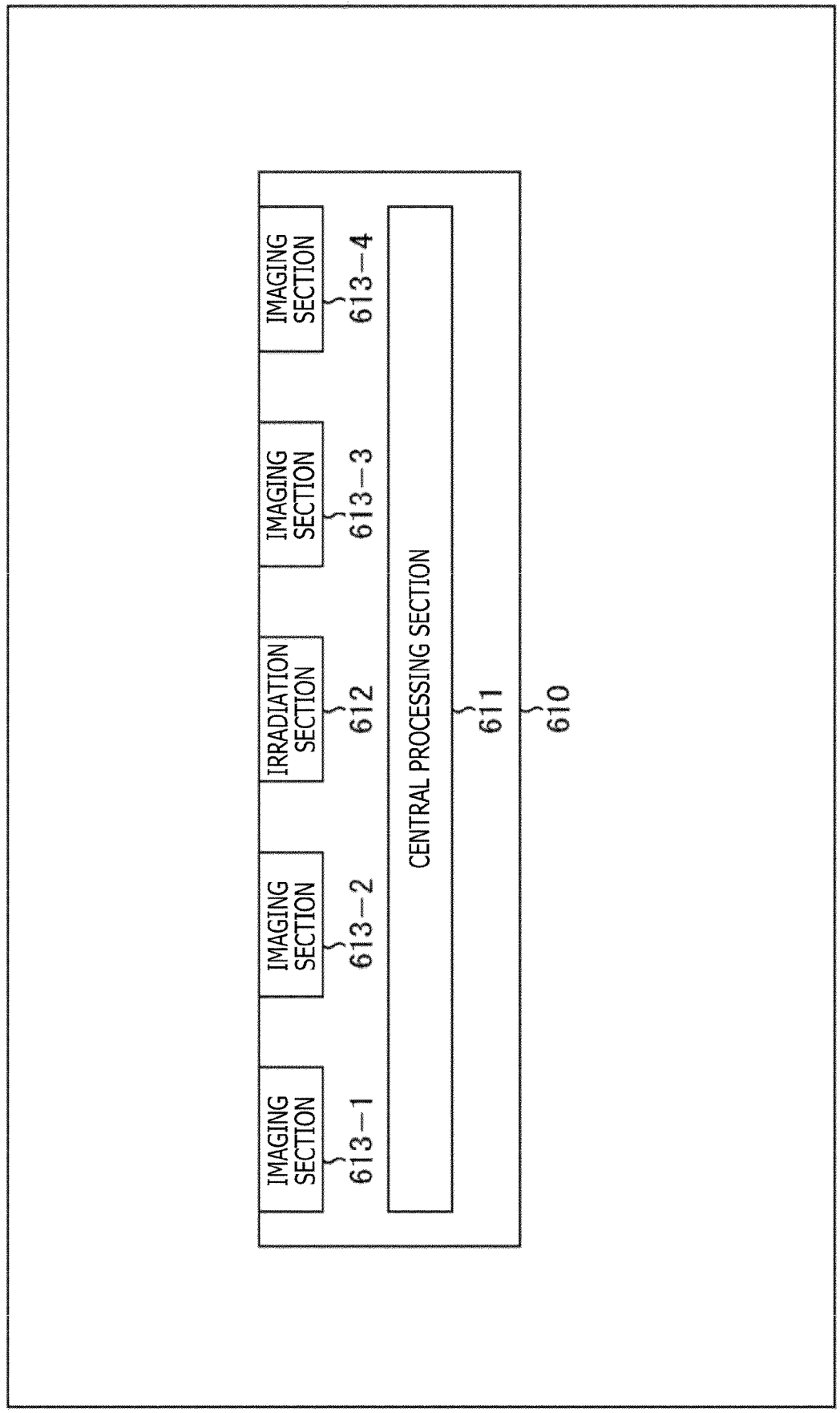
FIG. 19 is a block diagram depicting an example of a main configuration of an irradiation imaging apparatus.

In addition, for example, as depicted in FIG. 19, the imaging system 100 may be configured as one apparatus. An imaging apparatus 610 depicted in FIG. 19 includes a central processing section 611, an irradiation section 612, and imaging sections 613 (an imaging section 613-1 to an imaging section 613-4).

In the imaging apparatus 610, the central processing section 611 executes the processing which is to be executed in the central processing unit 111, thereby performing the detection or the like of the correspondence point by controlling the irradiation section 612 and the imaging sections 613.

Therefore, similarly to the case of the imaging system 100, the present technology can also be applied to the imaging apparatus 610 having such a configuration, and the action and the effects described above can be offered.

Obviously, the configuration of the imaging apparatus 610 is arbitrary, and is by no means limited to the example of FIG. 19. For example, the central processing sections 611, the irradiation sections 612, and the imaging sections 613 are arbitrary in number.

4. Others

<Application Field of the Present Disclosure>

The present technology, for example, can be applied to a system, an apparatus, a processing section or the like which is utilized in an arbitrary field such as traffic, medical care, crime prevention, agriculture, a stock farming, a mining industry, beauty, a factory, consumer electronics, weather, nature monitoring or the like as long as in the field, the image is processed.

For example, the present technology can also be applied to a system or a device used for appreciation. In addition, for example, the present technology can also be applied to a system or a device used for traffic management. Moreover, for example, the present technology can also be applied to a system or a device used for security. In addition, for example, the present technology can also be applied to a system or a device used for sports. Furthermore, for example, the present technology can also be applied to a system or a device used for agriculture. Moreover, for example, the present technology can also be applied to a system or a device used for a stock farming. Furthermore, for example, the present technology can also be applied to a system or a device used for monitoring the state of the nature such as a volcano, a forest, or the ocean. In addition, the present technology, for example, can also be applied to a weather observation system or a weather observation apparatus observing weather, a temperature, a humidity, a wind speed, or day length. Furthermore, the present technology, for example, can also be applied to a system, a device or the like observing the ecology of the wildlife such as the birds, the fishes, the reptiles, the amphibians, the mammals, the insects, or the plant.

<Software>

The series of processing described above can be executed by hardware, or can be executed by software. In the case where the series of processing described above are executed by the software, a program constituting the software is installed from the network or the recording medium.

For example, in case of the central processing unit 111 deposited in FIG. 4, the recording medium includes the removable medium 216 in which the program is recorded and which is distributed for delivering the program to the user separately from the unit main body. In this case, for example, the removable medium 216 is mounted to the drive 215, whereby the program stored in the removable medium 216 can be read out to be installed in the storage section 213.

In addition, the program can also be provided via a wired or wireless transmission medium such as a local area network, the Internet, or digital satellite broadcasting. For example, in case of the central processing unit 111 of FIG.

4, the program can be received by the communication section 214, and installed in the storage section 213.

Otherwise, the program can be previously installed in the storage section, the ROM or the like. For example, in case of the central processing unit 111 of FIG. 4, the program can be previously installed in the storage section 213, the ROM 202 or the like. In addition, for example, in case of the central processing unit 111 of FIG. 4, the program can also be previously installed in a ROM (not depicted) built in the storage section 213 or the CPU 201.

Incidentally, with respect to the program which is to be executed by the computer, the pieces of processing of Steps describing the program may be executed in time-series manner along the order described in the present description, or may be executed individually in parallel to one another at a necessary timing when, for example, a call is made. Moreover, the pieces of processing of Steps describing the program may be executed in parallel to the pieces of processing other program, or may be executed in combination with the pieces of processing of other program.

In addition, the pieces of processing of Steps described above can be executed in the apparatuses or units described above, or an arbitrary apparatus or unit other than the apparatuses or units described above. In this case, it is only necessary that the apparatus or unit which is to execute the pieces of processing has a function (a function block or the like) necessary for executing the processing. In addition, it is only necessary that the information necessary for the pieces of processing is suitably transmitted to the apparatus or unit.

<Others>

The embodiments of the present technology are by no means limited to the embodiments described above, and various changes can be made without departing from the subject matter of the present technology.

For example, in the present description, the system means a set of a plurality of constituent elements (apparatus, module (component) or the like), and it does not matter whether or not all the constituent elements are present within the same chassis. Therefore, a plurality of apparatuses which is accommodated in different chassis and is connected through a network, and one apparatus a plurality of modules of which is accommodated in one chassis are each the system.

In addition, for example, the configuration described as one apparatus (or the processing section) may be divided to configure a plurality of apparatuses (or processing sections). Contrary to this, the configuration described as a plurality of apparatuses (or processing sections) in the above may be collected into one apparatus (or processing section). In addition, a configuration other than the configuration described above may be, obviously, added to the configuration of the apparatuses (or the processing sections). Moreover, if a configuration or an operation as the whole system is substantially the same, a part of a configuration of a certain apparatus (or processing section) may be included in a configuration of other apparatus (or other processing section).

In addition, for example, the present technology can adopt a configuration of cloud computing in which one function is processed by sharing and collaborating in a plurality of apparatuses via a network.

In addition, for example, Steps described in the above flow chart can be executed not only by one apparatus, but also by sharing in a plurality of apparatuses. Moreover, in the case where a plurality of processing is included in one Step, the plurality of processing included in one Step can be executed not only by one apparatus or unit, but also by sharing in a plurality of apparatuses or units.

In addition, the present technology can be carried out not only as the apparatus or the system, but also as all the constituent elements mounted to the apparatus configuring the apparatus or the system, for example, such as a processor as a system LSI (Large Scale Integration) or the like, a module using a plurality of processors or the like, a unit using a plurality of modules or the like, or a set in which other functions are further added to the unit (i.e., a constituent element of a part of the apparatus).

It should be noted that a plurality of present technologies described above in the present description can be independently, solely carried out unless the conflict is caused. Obviously, a plurality of arbitrary present technologies can also be carried out in combination with one another. For example, the present technology which is described in some embodiment can also be carried out in combination with the present technology which is described in other embodiment. In addition, the arbitrary present technology described above can also be carried out in combination with other present technology not described above.

<Complement>

It should be noted that the various kinds of pieces of information (metadata or the like) associated with the encoded data (bit stream) may be caused to be transmitted or recorded in any form as long as the various kinds of pieces of information are associated with the encoded data. Here, the term "be associated with," for example, means that when one data is processed, the other data is caused to be enabled to be utilized (may be caused to be enabled to be linked). In other words, the pieces of data associated with each other may be collected as one piece of data, or may be made the individual pieces of data, respectively. For example, information associated with encoded data (image) may be transmitted on a transmission line different from that for the encoded data (image). In addition, for example, information associated with encoded data (image) may be recorded in a recording medium different from the encoded data (image) (or a different recording area of the same recording medium). It should be noted that "be associated with" may not be used in the entire data, but may be used in a part of data. For example, an image and information corresponding to the image may be associated with each other in an arbitrary unit such as a plurality of frames, one frame, or a part within a frame.

It should be noted that the present technology can also adopt the following constitutions.

(1)

An information processing apparatus including:

a calculation section, with respect to a detection result of a correspondence point between an imaged image including a pattern irradiated for alignment with other imaged image, and the other imaged image including the pattern, calculating an evaluation value with which an occurrence rate of an error in the alignment when the imaged image and the other imaged image are composed with each other is evaluated; and an update section updating an irradiated position of the pattern on the basis of the evaluation value calculated by the calculation section.

(2)

The information processing apparatus according to (1), in which the calculation section calculates the evaluation value on the basis of magnitude of an error in matching for a predetermined partial area including the pattern.

(3)

The information processing apparatus according to (2), in which the calculation section, regardless of the error is larger or smaller than a predetermined range, sets the evaluation value to a value representing that the occurrence rate of the error is higher than that of a case where the error falls within the predetermined range.

(4)

The information processing apparatus according to any one of (1) to (3), in which the calculation section calculates the evaluation value on the basis of the magnitude of the error in the matching for the predetermined partial area including the pattern, and a feature amount of image of the partial area.

(5)

The information processing apparatus according to (4), in which the calculation section, in a case where the error is larger than a predetermined threshold value, sets the evaluation value to a value representing that the occurrence rate of the error is higher than that of a case where the error is equal to or lower than the predetermined threshold value.

(6)

The information processing apparatus according to (4) or (5), in which the feature amount of image includes a parameter associated with dispersion of pixel values.

(7)

The information processing apparatus according to (6), in which the calculation section, in a case where the parameter associated with the dispersion of the pixel values is smaller than a predetermined threshold value, sets the evaluation value to a value representing that the occurrence rate of the error is higher than that of a case where the parameter associated with the dispersion of the pixel values is equal to or larger than the predetermined threshold value.

(8)

The information processing apparatus according to any one of (1) to (7), in which the calculation section calculates the evaluation value on the basis of the magnitude of the error in the matching for the predetermined partial area including the pattern, and information associated with a relative posture between an imaging section performing imaging to create the imaged image, and other imaging section performing imaging to create the other imaged image.

(9)

The information processing apparatus according to (8), in which the calculation section, in a case where the error is larger than a predetermined threshold value, sets the evaluation value to a value representing that the occurrence rate of the error is higher than that of a case where the error is equal to or lower than the predetermined threshold value.

(10)

The information processing apparatus according to (8) or (9), in which the information associated with the relative posture includes magnitude of an error between the relative posture, based on the detected correspondence point, between the imaging section and the other imaging section, and an actual relative posture.

(11)

The information processing apparatus according to (10), in which the calculation section sets the calculation value to a value representing that as the error is larger, the occurrence rate of the error is higher.

(12)

The information processing apparatus according to any one of (1) to (11), in which the update section, in a case where the evaluation value is set to the value representing that the occurrence rate of the error is higher than the predetermined threshold value, updates an irradiated position of the pattern so as to increase the number of patterns irradiated to an area in which the imaged image and the other imaged image are superimposed on each other.

(13)

The information processing apparatus according to (12), in which the update section moves an irradiated position of an other pattern included in the imaged image to the area.

(14)

The information processing apparatus according to (12), in which the update section moves the irradiated position of an other pattern irradiated to an outside of the imaged image to the area.

(15)

The information processing apparatus according to any one of (1) to (14), further including:

a correspondence point detecting section detecting a correspondence point between the imaged image and the other imaged image by matching for a predetermined partial area including the pattern, in which the calculation section is configured to calculate the evaluation value with respect to the detection result of the correspondence point obtained by the correspondence point detecting section.

(16)

The information processing apparatus according to (15), in which the correspondence point detecting section detects the correspondence point on the basis of the newest pattern irradiation.

(17)

The information processing apparatus according to (15), in which the correspondence point detecting section detects the correspondence point on the basis of a plurality of times of pattern irradiation.

(18)

The information processing apparatus according to any one of (1) to (17), in which the pattern is irradiated as a laser beam.

(19)

The information processing apparatus according to any one of (1) to (18), in which the pattern is irradiated as infrared light.

(20)

An information processing method including:

with respect to a detection result of a correspondence point between an imaged image including a pattern irradiated for alignment with other imaged image, and the other imaged image including the pattern, calculating an evaluation value with which an occurrence rate of an error in the alignment when the imaged image and the other imaged image are composed with each other is evaluated; and updating an irradiated position of the pattern on the basis of the evaluation value calculated.

REFERENCE SIGNS LIST

100 Imaging system, 111 Central processing unit, 112 Irradiation device, 113 Imaging apparatus, 201 CPU, 251 Pattern irradiating section, 252 Imaging section, 253 Correspondence point detecting section, 254 Evaluation value calculating section, 255 Decision section, 256 Irradiated pattern updating section, 401 Coordinate transforming section, 402 Distance calculating section, 403 Distance reliability calculating section, 501 Color filter, 502 IR filter, 503

Filter, 600 Imaging system, 601 Network, 610 Imaging apparatus, 611 Central processing section, 612 Irradiation section, 613 Imaging section

The invention claimed is:

1. An information processing apparatus, comprising:
a calculation section configured to calculate an evaluation value of an occurrence rate of an error in an alignment of a first imaged image with a second imaged image, wherein
the evaluation value is calculated based on a correspondence point between the first imaged image and the second imaged image,
each of the first imaged image and the second imaged image includes a first pattern for the alignment of the first imaged image with the second imaged image, and
the correspondence point is based on the first pattern in each of the first imaged image and the second imaged image; and
an update section configured to update an irradiated position of the first pattern in each of the first imaged image and the second imaged image based on the calculated evaluation value.

2. The information processing apparatus according to claim 1, wherein
the calculation section is further configured to calculate the evaluation value based on a magnitude of the error in the alignment of a partial area of each of the first imaged image and the second imaged image, and
the partial area of each of the first imaged image and the second imaged image includes the first pattern.

3. The information processing apparatus according to claim 2, wherein
the calculation section is further configured to set the evaluation value to a first value based on the error that is one of larger or smaller than a specific range,
the first value indicates a higher occurrence rate of the error in the alignment than a second value, and
the second value represents that the error is within the specific range.

4. The information processing apparatus according to claim 1, wherein the calculation section is further configured to calculate the evaluation value based on:
a magnitude of the error in the alignment of a partial area of each of the first imaged image and the second imaged image, wherein the partial area of each of the first imaged image and the second imaged image includes the first pattern, and
a feature amount of the partial area of each of the first imaged image and the second imaged image.

5. The information processing apparatus according to claim 4, wherein
the calculation section is further configured to set the evaluation value to a first value based on the error that is larger than a threshold value,
the first value indicates a higher occurrence rate of the error than a second value, and
the second value represents that the error is one of equal to or lower than the threshold value.

6. The information processing apparatus according to claim 4, wherein the feature amount of the partial area of each of the first imaged image and the second imaged image includes a parameter associated with dispersion of pixel values.

7. The information processing apparatus according to claim 6, wherein
the calculation section is further configured to set the evaluation value to a first value based on the parameter that is smaller than a threshold value,
the first value indicates a higher occurrence rate of the error than a second value, and
the second value represents that the parameter is one of equal to or larger than the threshold value.

8. The information processing apparatus according to claim 1, wherein the calculation section is further configured to calculate the evaluation value based on:
a magnitude of the error in the alignment of a partial area of each of the first imaged image and the second imaged image, wherein the partial area of each of the first imaged image and the second imaged image includes the first pattern, and
information associated with a first relative posture between a first imaging section and a second imaging section, wherein
the first imaging section captures the first imaged image, and
the second imaging section captures the second imaged image.

9. The information processing apparatus according to claim 8, wherein
the calculation section is further configured to set the evaluation value to a first value based on the magnitude of the error that is larger than a threshold value,
the first value indicates a higher occurrence rate of the error than a second value, and
the second value represents that the error is one of equal to or lower than the threshold value.

10. The information processing apparatus according to claim 8, wherein the information associated with the first relative posture includes a magnitude of an error between:
the first relative posture, of the first imaging section and the second imaging section based on the correspondence point, and
a second relative posture of the first imaging section and the second imaging section in real space.

11. The information processing apparatus according to claim 10, wherein the occurrence rate of the error in the alignment increases based on an increase in the error between the first relative posture and the second relative posture.

12. The information processing apparatus according to claim 1, wherein
the calculation section is further configured to set the evaluation value to a specific value that indicates that the occurrence rate of the error is higher than a threshold value, and
the update section is further configured to increase a number of a plurality of patterns irradiated to a first area in which the first imaged image is superimposed on the second imaged image.

13. The information processing apparatus according to claim 12, wherein the update section is further configured to move an irradiated position of a second pattern included in the first imaged image to the first area.

14. The information processing apparatus according to claim 12, wherein the update section is further configured to move an irradiated position of a third pattern irradiated to an outside of the first imaged image to the first area.

15. The information processing apparatus according to claim 1, further comprising a correspondence point detecting section configured to detect the correspondence point between the first imaged image and the second imaged image based on the alignment of a partial area of each of the first imaged image and the second imaged image, wherein
the partial area of each of the first imaged image and the second imaged image includes the first pattern, and
the calculation section is further configured to calculate the evaluation value based on the detection of the correspondence point.

16. The information processing apparatus according to claim 1, wherein the correspondence point detecting section is further configured to detect the correspondence point based on a newest pattern irradiation.

17. The information processing apparatus according to claim 1, wherein the correspondence point detecting section is further configured to detect the correspondence point based on a plurality of times of irradiation of the first pattern.

18. The information processing apparatus according to claim 1, wherein the first pattern is irradiated as a laser beam.

19. The information processing apparatus according to claim 1, wherein the first pattern is irradiated as infrared light.

20. An information processing method, comprising:
calculating an evaluation value of an occurrence rate of an error in an alignment of a first imaged image with a second imaged image, wherein
the evaluation value is calculated based on a correspondence point between the first imaged image and the second imaged image,
each of the first imaged image and the second imaged image includes a pattern for the alignment of the first imaged image with the second imaged image, and
the correspondence point is based on the pattern in each of the first imaged image and the second imaged image; and
updating an irradiated position of the pattern in each of the first imaged image and the second imaged image based on the calculated evaluation value.

21. An information processing apparatus, comprising:
a correspondence point detecting section configured to detect a correspondence point between a first imaged image and a second imaged image based on an alignment of a partial area of each of the first imaged image and the second imaged image,
wherein the partial area of each of the first imaged image and the second imaged image includes a pattern for the alignment;
a calculation section configured to calculate an evaluation value of an occurrence rate of an error in the alignment of the partial area of each of the first imaged image and the second imaged image, wherein the evaluation value is calculated based on the detected correspondence point; and
an update section configured to update an irradiated position of the pattern in each of the first imaged image and the second imaged image based on the calculated evaluation value.

* * * * *